United States Patent [19]
Gupta et al.

[11] Patent Number: 5,627,984
[45] Date of Patent: May 6, 1997

[54] APPARATUS AND METHOD FOR ENTRY ALLOCATION FOR A BUFFER RESOURCE UTILIZING AN INTERNAL TWO CYCLE PIPELINE

[75] Inventors: Shantanu R. Gupta, Beaverton; James S. Griffith, Aloha, both of Oreg.

[73] Assignee: Intel Corporation, Santa Clara, Calif.

[21] Appl. No.: 624,187

[22] Filed: Mar. 28, 1996

Related U.S. Application Data

[63] Continuation of Ser. No. 269,435, Jun. 30, 1994, abandoned, which is a continuation-in-part of Ser. No. 40,659, Mar. 31, 1993, Pat. No. 5,560,025.

[51] Int. Cl.$^6$ ............................................. G06F 12/02
[52] U.S. Cl. ................. 395/392; 395/250; 364/955.2; 364/958.2
[58] Field of Search .................... 395/375, 250; 364/955.2, 958.2

[56] References Cited

U.S. PATENT DOCUMENTS

| | | | |
|---|---|---|---|
| 5,129,066 | 7/1992 | Schmookler | 395/565 |
| 5,226,126 | 7/1993 | McFarland et al. | 395/394 |
| 5,345,569 | 9/1994 | Tran | 395/393 |
| 5,490,280 | 2/1996 | Gupta et al. | 395/800 |

OTHER PUBLICATIONS

Popescu et al.; The Metaflow Architecture; Jun. 1991; IEEE Micro pp. 10–73.
Johnson, "Superscalar Microprocessor Design", 1991, pp. 87, 129–144, 145, 166–169.
Tanenbaum, "Modern Operating Systems", 1992, pp. 83–84.
Hennessy et al. "Computer Architecture A Quantitative Approach", 1990, pp. 299–307.
Microsoft Press, "Computer Dictionary", 1994, p. 265.

*Primary Examiner*—Robert B. Harrell
*Assistant Examiner*—Kenneth R. Coulter
*Attorney, Agent, or Firm*—Blakely, Sokoloff, Taylor & Zafman

[57] ABSTRACT

A two cycle pipelined method and apparatus for allocating a number of vacant entries of a buffer resource and generating a set of enable vectors based thereon for a set of issued instructions. The procedure for determining the vacant entries is spread across two pipestages (clock cycles) of a pipelined superscalar processor. For each pipestage, the system receives information from the previous pipestage as to which entries were eligible for allocation but have not yet received instruction information as well as a set of speculative stall signals. For each pipestage, the reservation station informs the system as to which entries are vacant according to the reservation station's knowledge at that time; this is a preliminary deallocation vector. For each pipestage, the system also receives a list of the instructions for allocation to the reservation station for that cycle. The system formulates a modified deallocation vector from the above information by masking bits of the preliminary deallocation vector and also performs stall checking in the event there are not enough vacant entries. The system interrogates the modified deallocation vector to locate the vacancies within the reservation station for storage of instruction information associated with several issued operations. A general static and dynamic approach are disclosed for performing the vacant entry identification at high speed within a single clock cycle.

35 Claims, 15 Drawing Sheets

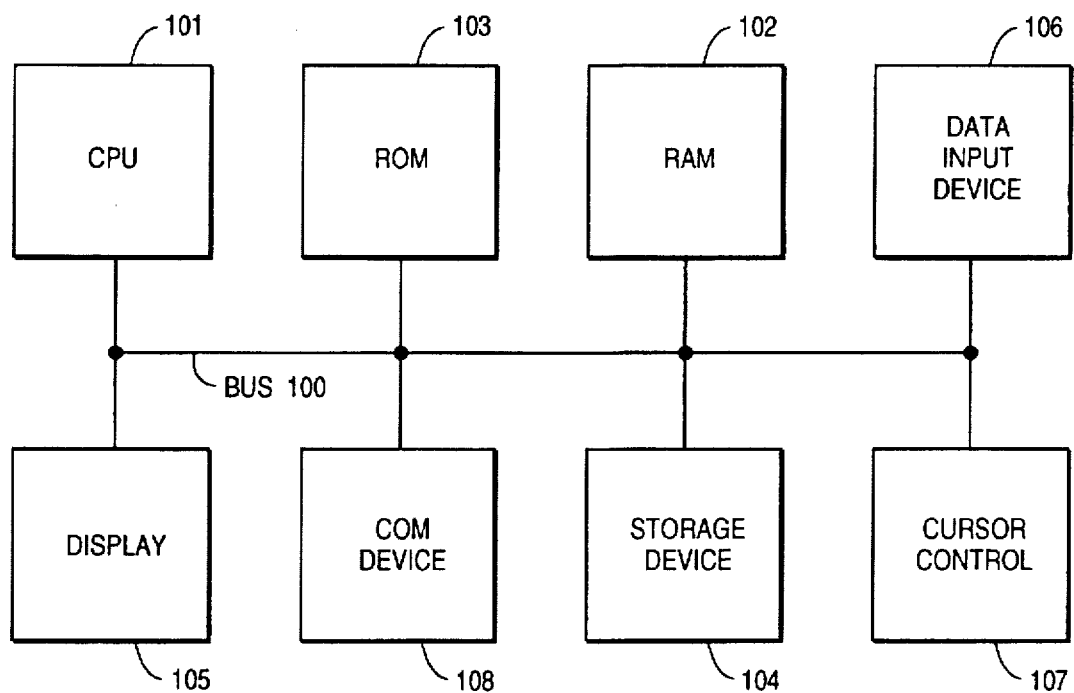
FIG_1A

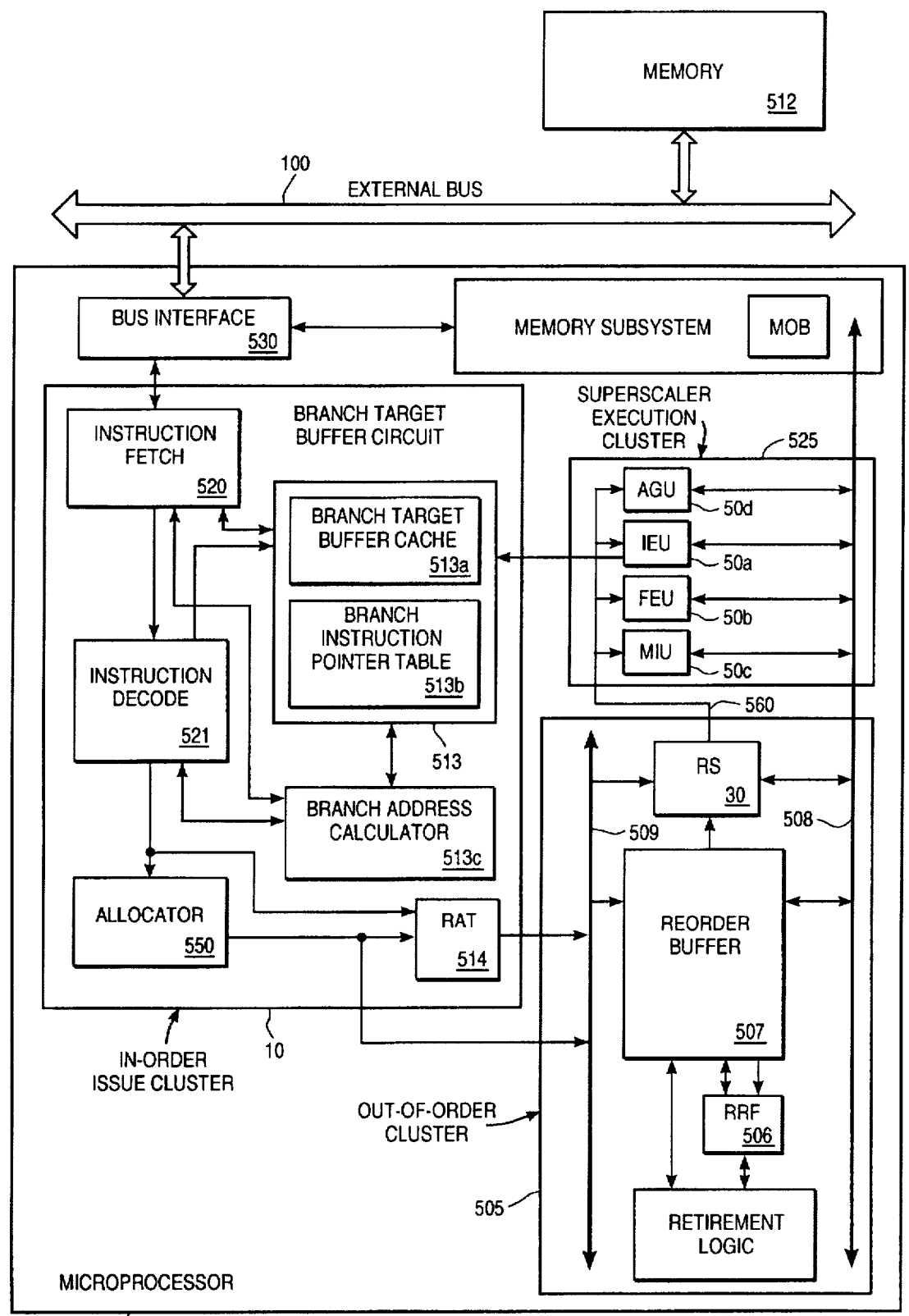
FIG_1B

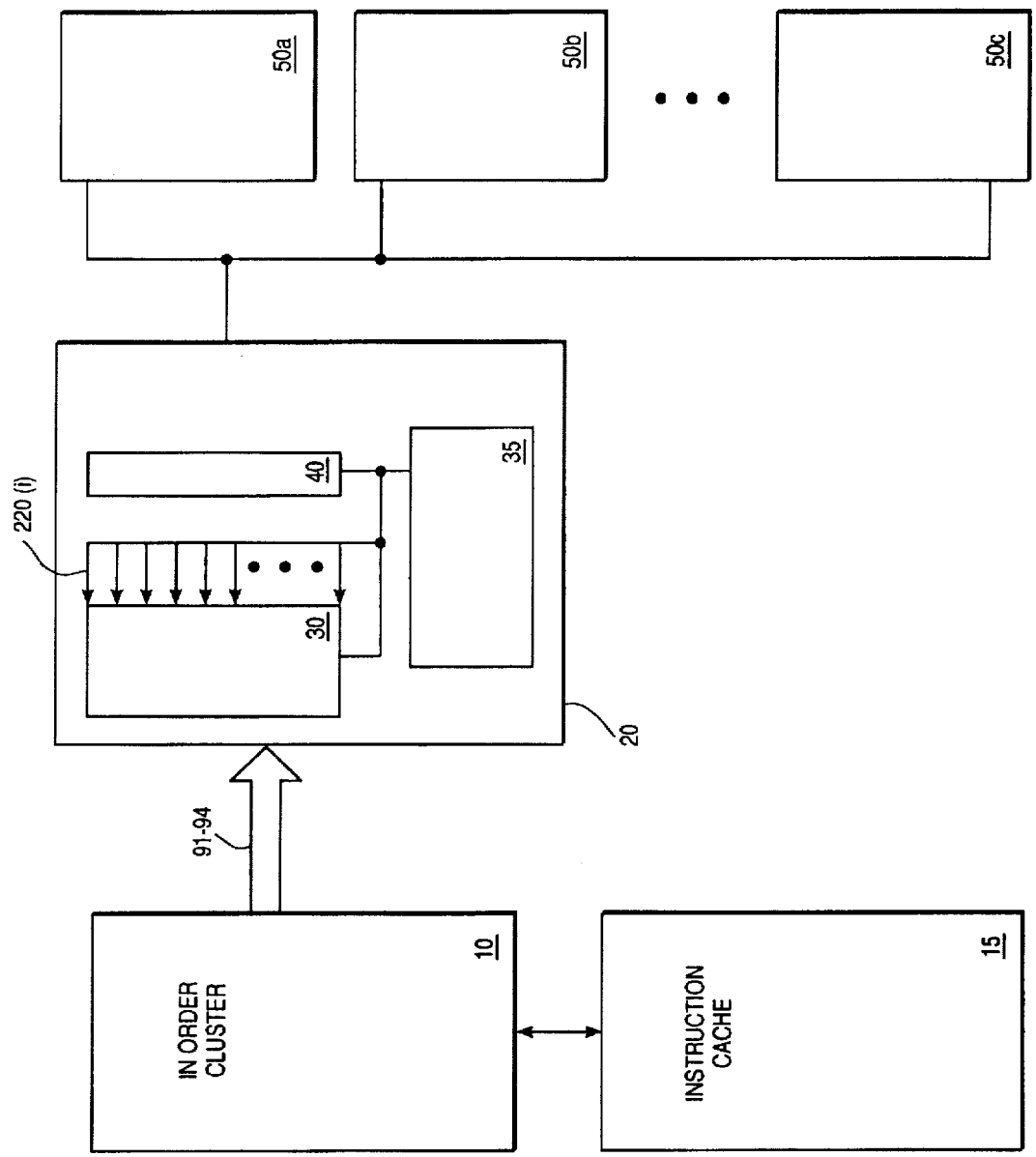
FIG._1C

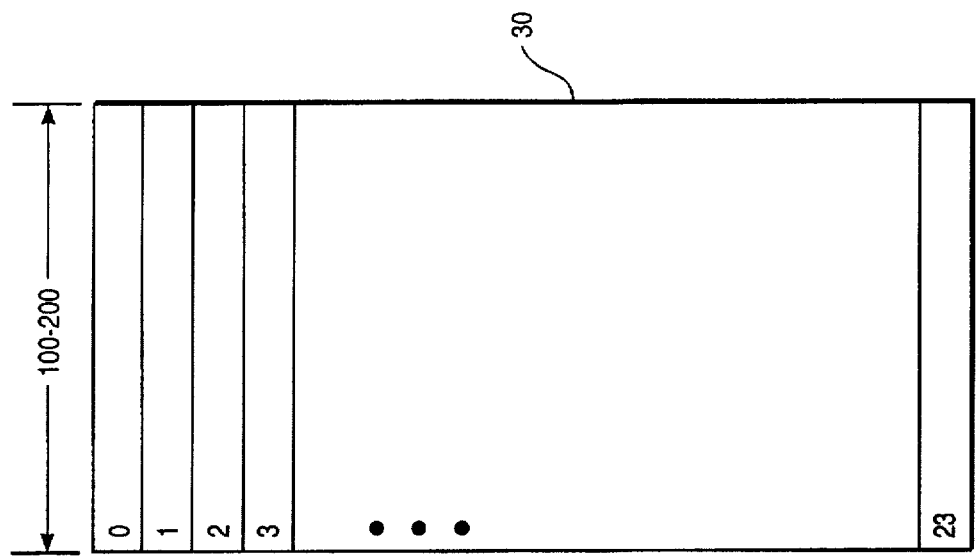
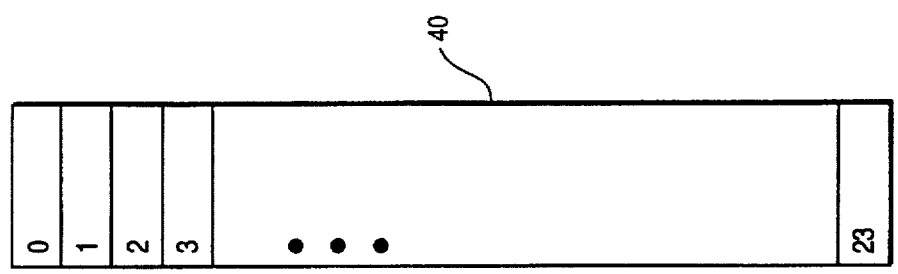
FIG_2

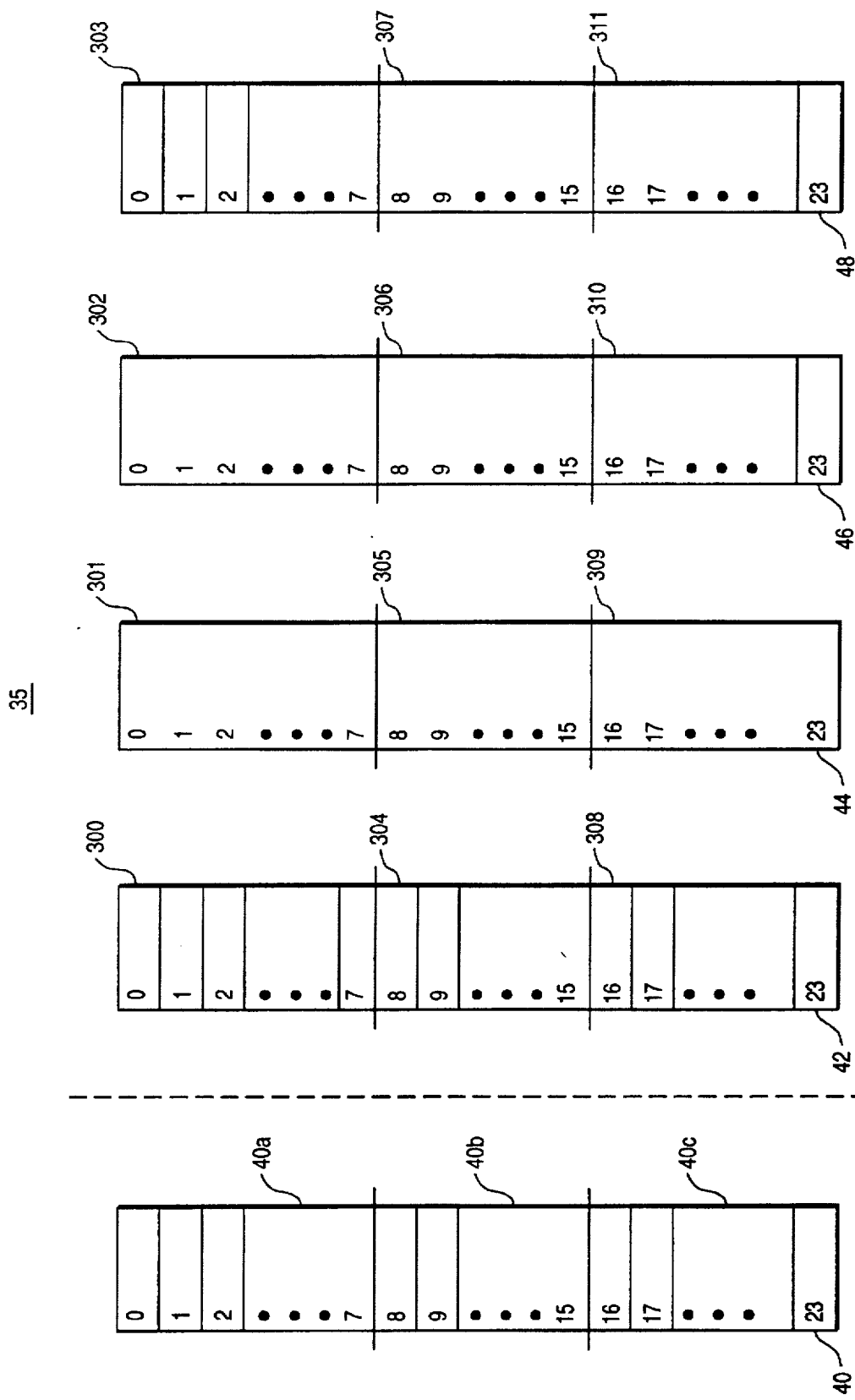
FIG_3

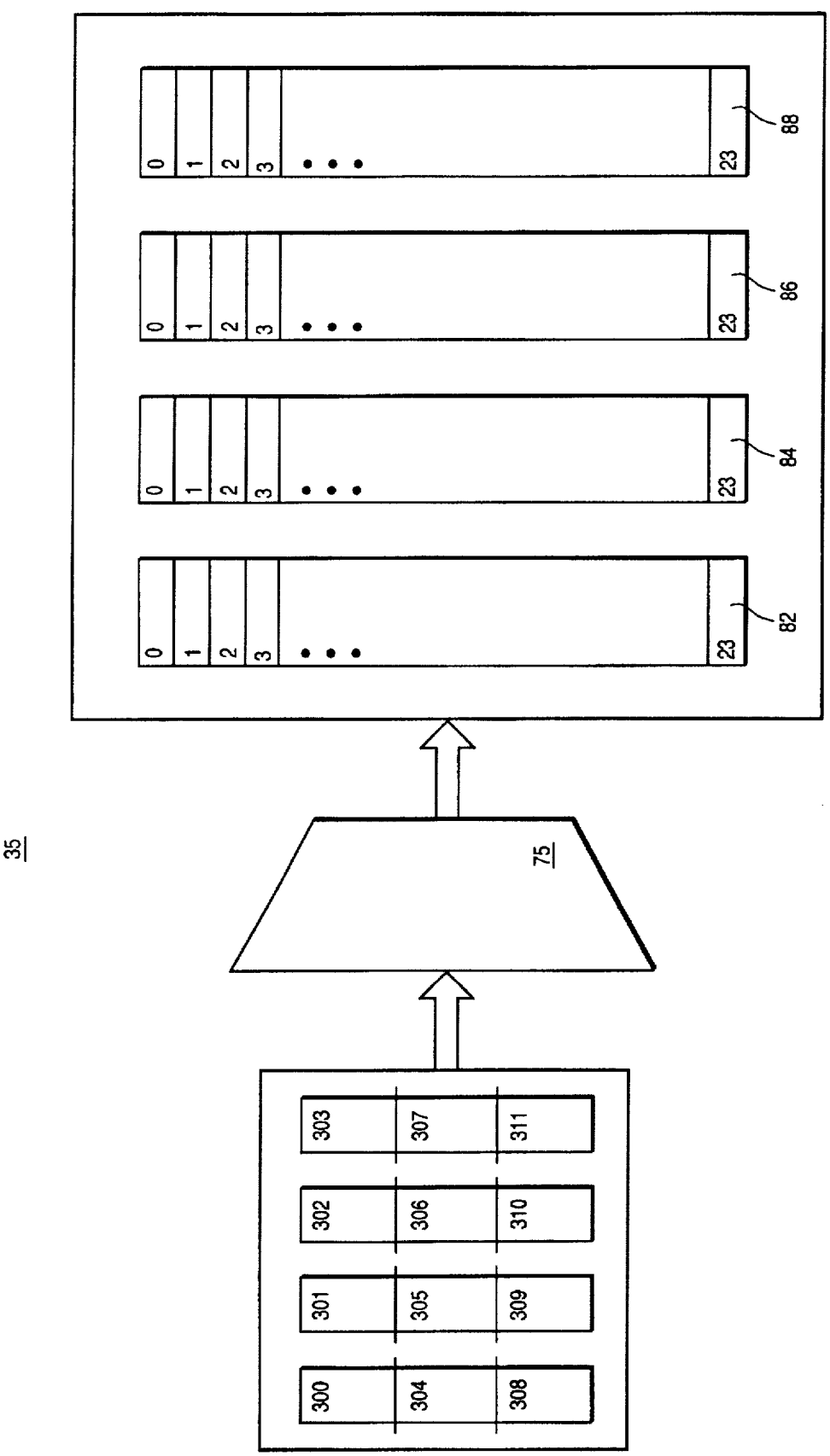
FIG_4

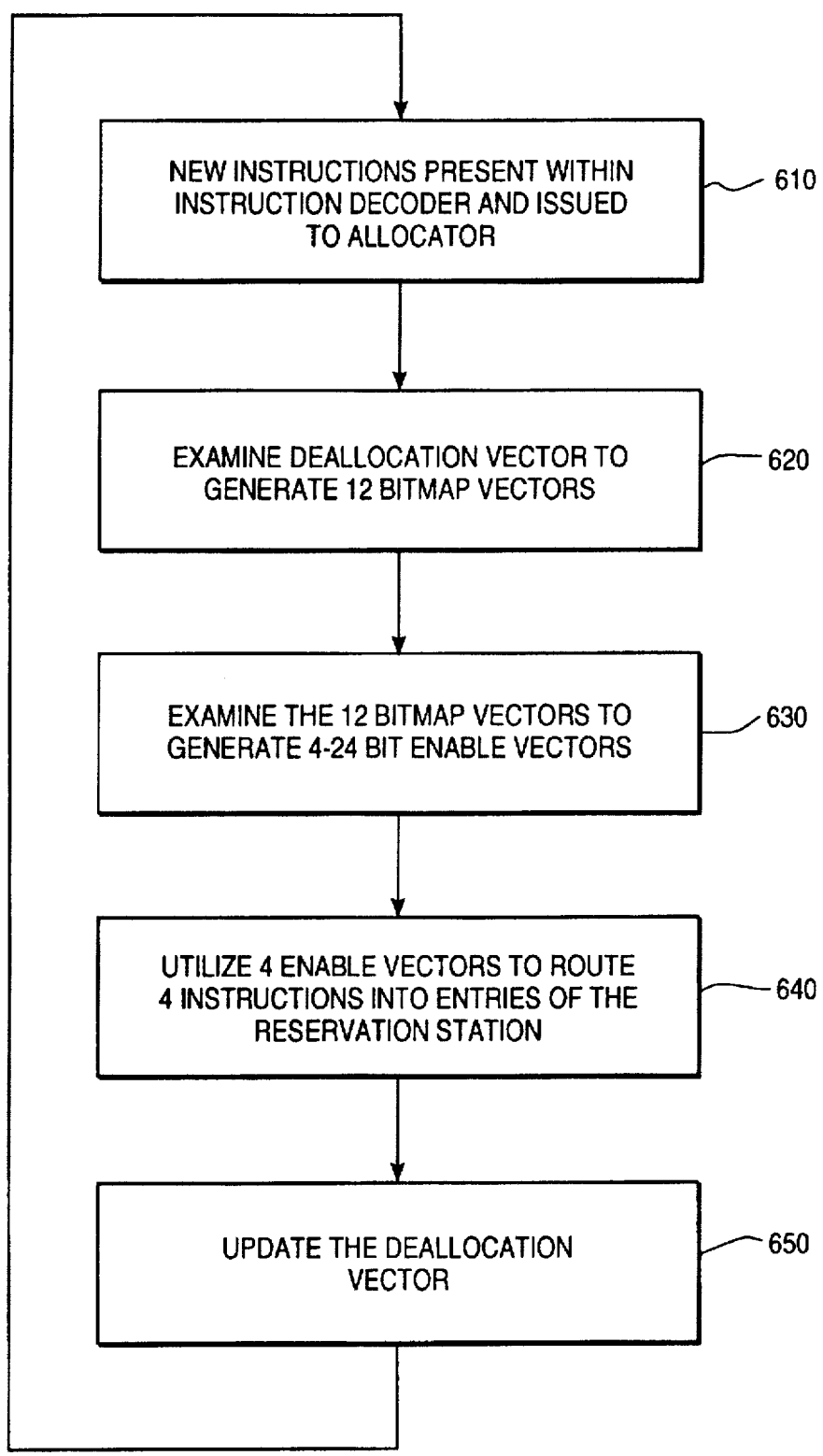
FIG_6

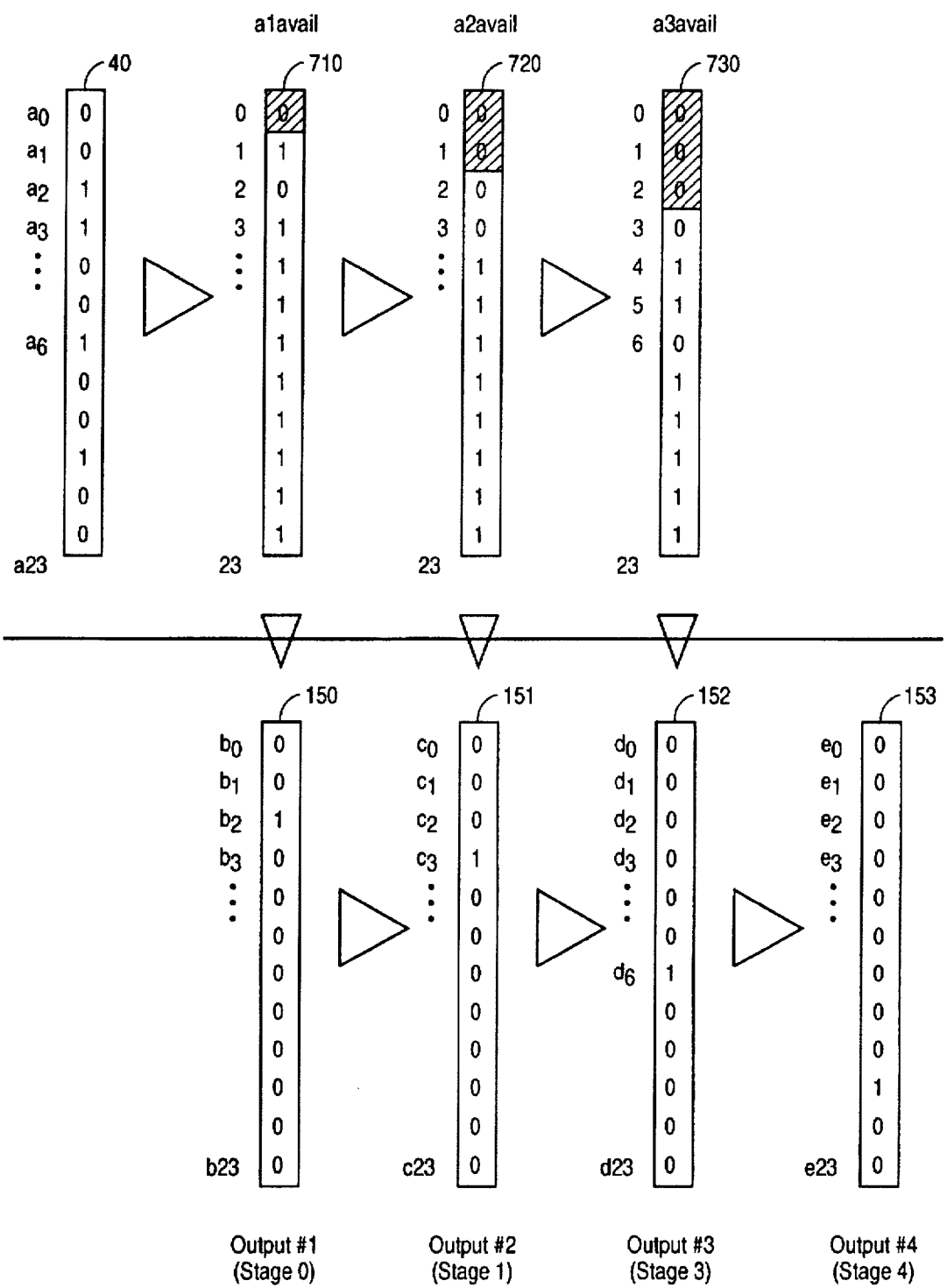
FIG_7

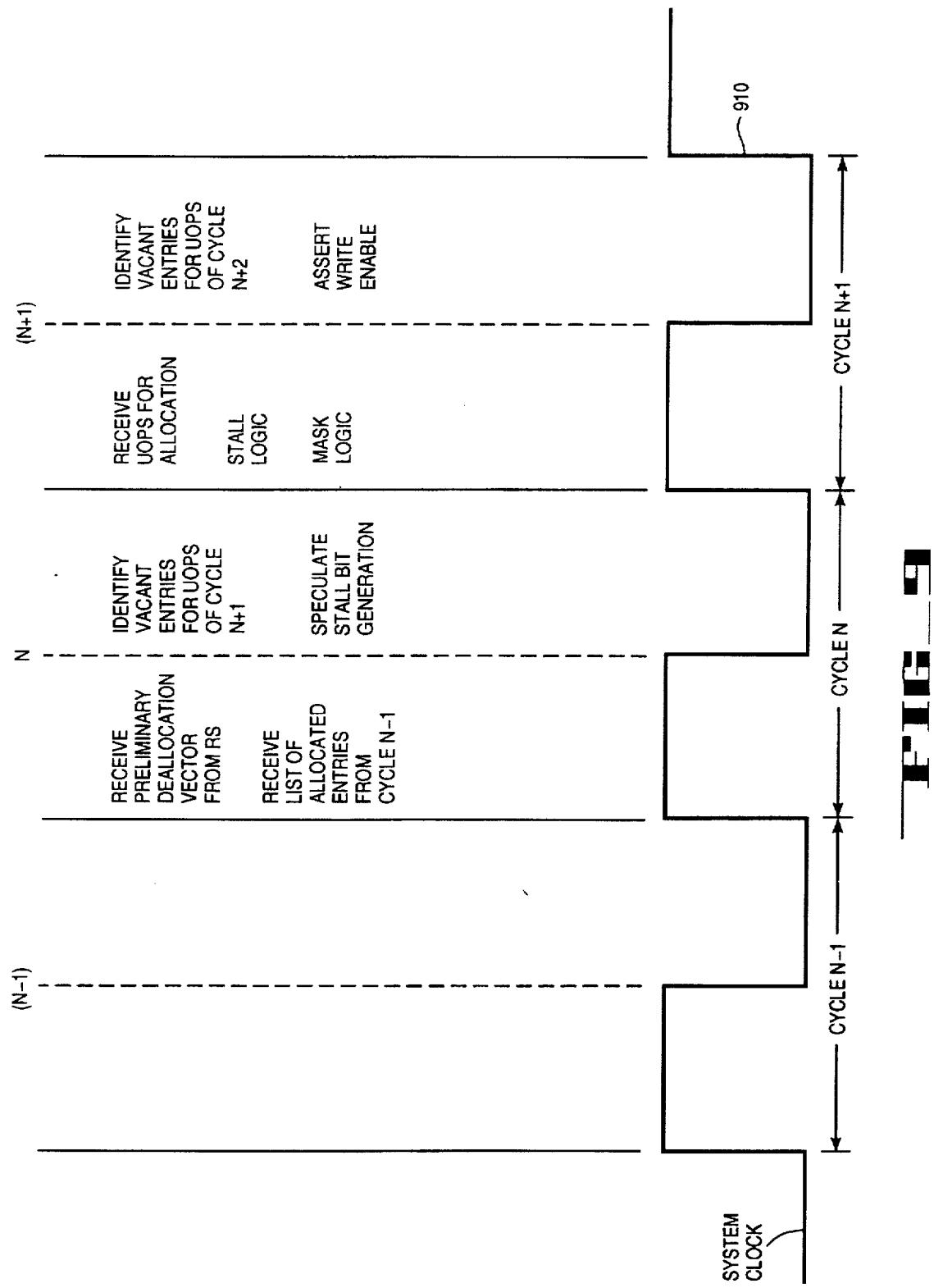
FIG_9

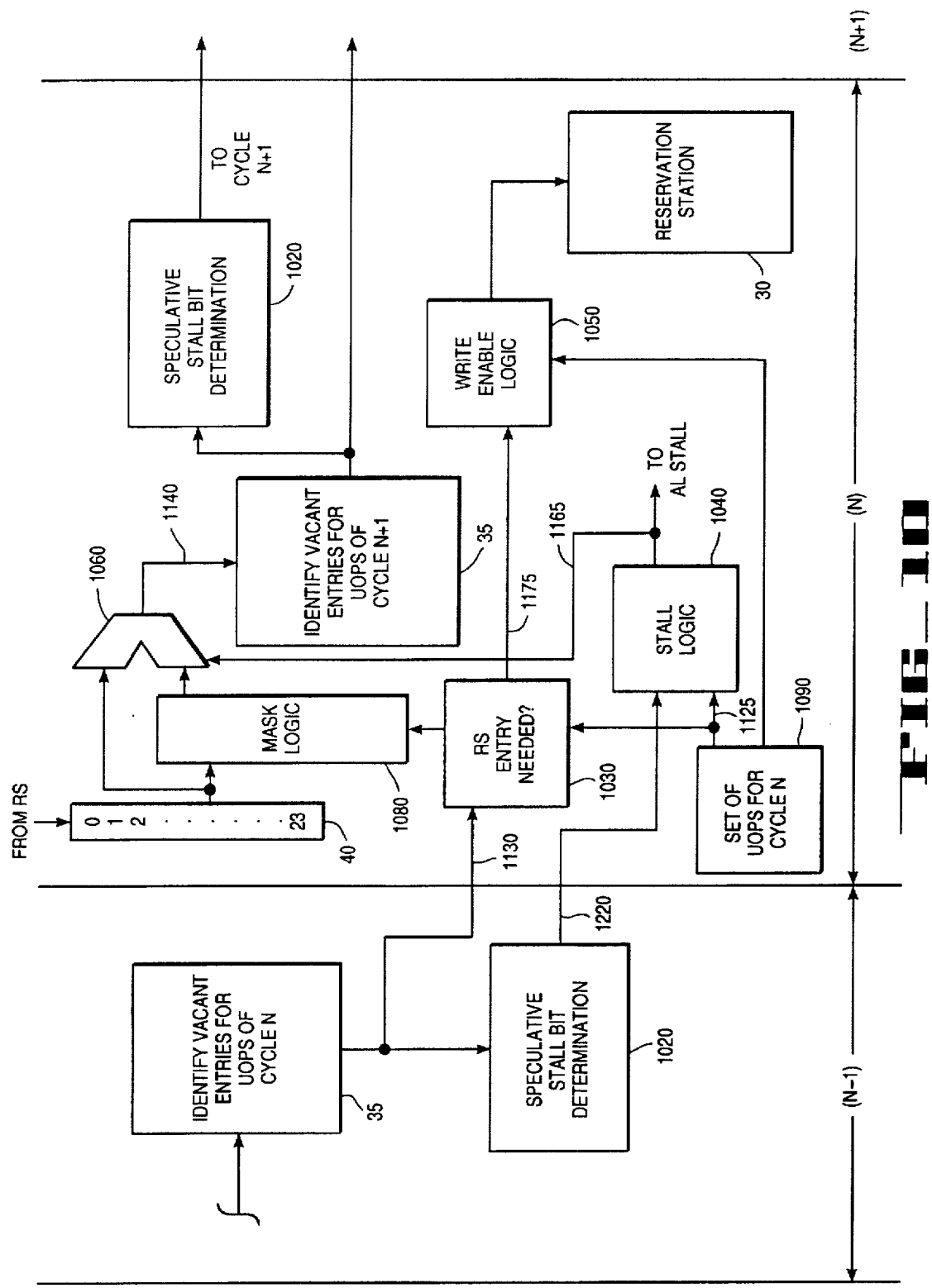
FIG_10

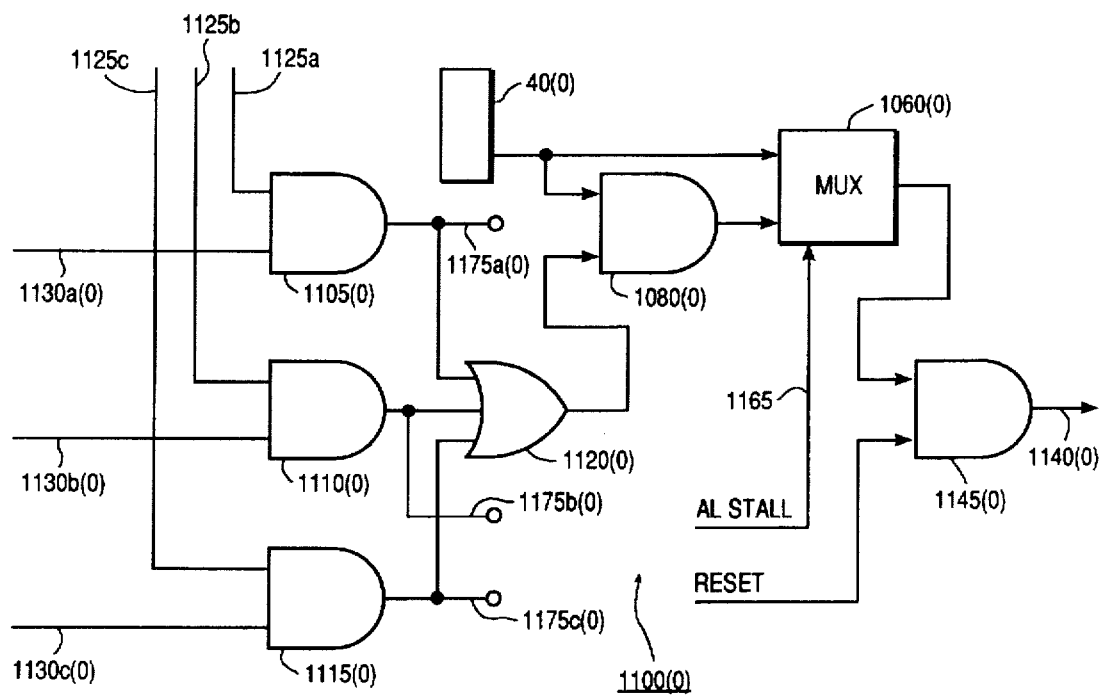
FIG_11A
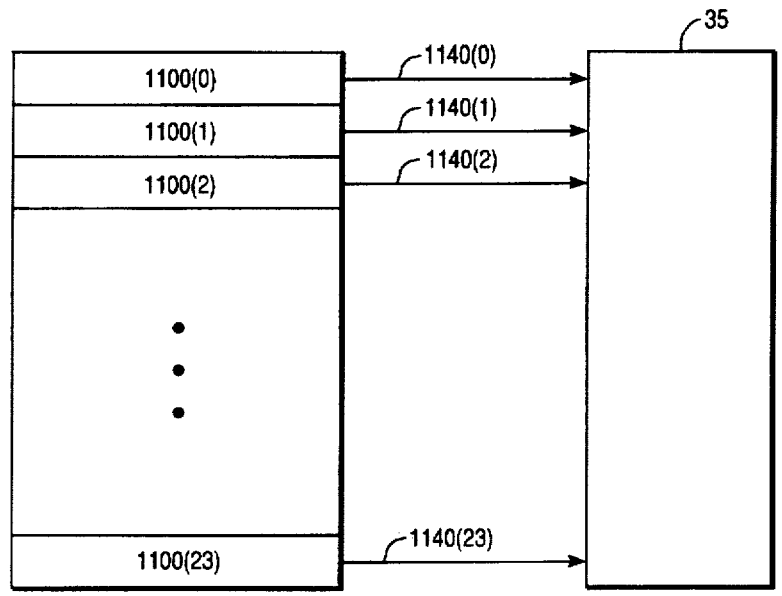
FIG_11B

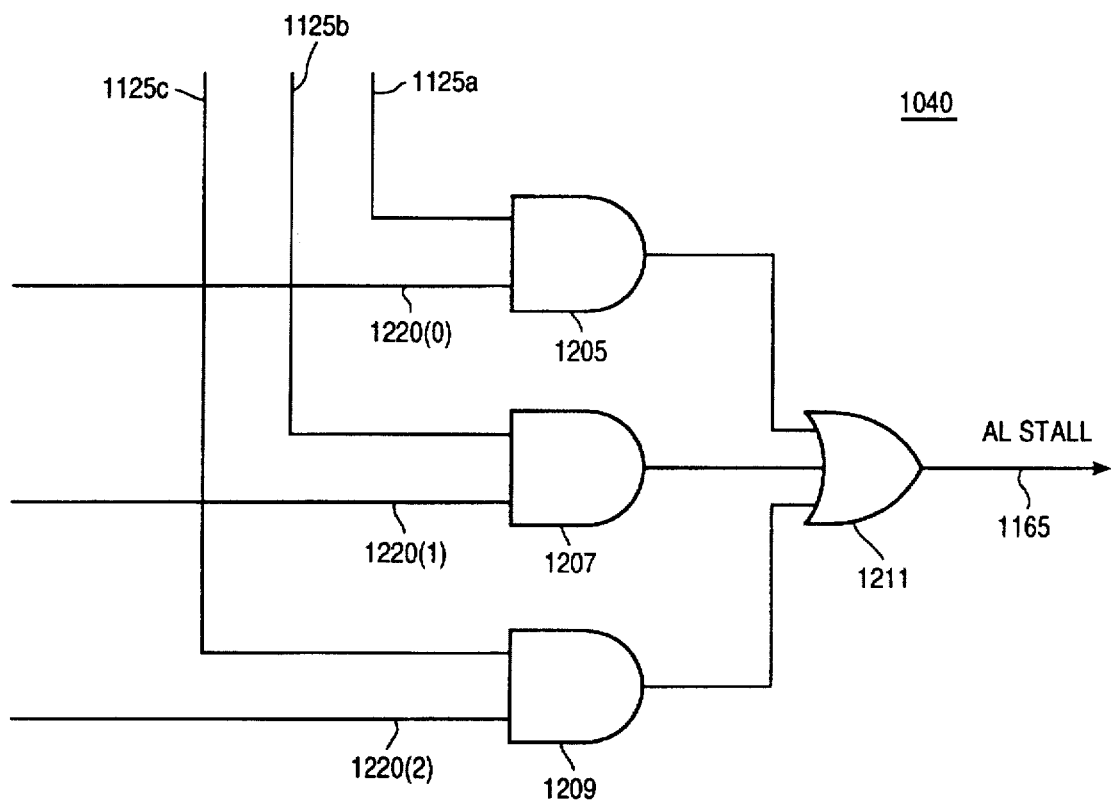
FIG_12

APPARATUS AND METHOD FOR ENTRY ALLOCATION FOR A BUFFER RESOURCE UTILIZING AN INTERNAL TWO CYCLE PIPELINE

The present application is a continuation application of application Ser. No. 08/269,435 (abandoned), filed on Jun. 30, 1994, and entitled "APPARATUS AND METHOD FOR ENTRY ALLOCATION FOR A BUFFER RESOURCE UTILIZING AN INTERNAL TWO CYCLE PIPELINE". Application No. 08/269,635, now abandoned, was a continuation-in-part of application Ser. No. 08/040,659, now U.S. Pat. No. 5,560,025 filed on Mar. 31, 1993, and entitled "Entry Allocation Apparatus and Method of Same", and assigned to the assignee of the present invention.

BACKGROUND OF THE INVENTION

(1) Field of the Invention

The present invention relates to the field of interrogating a vector to determine vacant entries of a buffer resource of a processor. More specifically, the present invention relates to the field of performing such interrogation utilizing an internal two cycle pipeline for increased performance.

(2) Prior Art

Modern microprocessors have the ability to execute portions of several instructions in parallel during a single clock cycle. These microprocessors are called superscalar microprocessors and have pipelined and/or superscalar architecture. In effect, different stages of execution can be performed by a microprocessor during a single clock cycle for several different microprocessor instructions. For this reason and others, microprocessors having this ability must be able to keep track of and store information regarding several instructions at the same time and communicate this information to and from several different portions of the microprocessor in a parallel fashion. Also, because of the high operating frequencies of modern pipelined microprocessors, this instruction information must be transmitted very quickly, usually during a single clock cycle of an oscillator operating at 150–200 Megahertz. Therefore, it becomes advantageous to be able to communicate instructions and instruction data very quickly.

One component within a microprocessor that must receive information regarding instructions that are being executed by a microprocessor is the instruction scheduler. The instruction scheduler holds information regarding the current instructions that are pending execution as well as any data or information that is used by or in conjunction with the current instructions. The instruction scheduler has a finite memory storage capacity. Therefore, new and recent instruction information that is to be placed into the scheduler by the microprocessor must first obtain enough memory location vacancies within the instruction scheduler. That is to say, there must first be room within the scheduler before instruction information can be placed into the instruction scheduler. The scheduler contains a memory array, and associated circuitry, for holding this instruction information; this circuit is called a reservation station.

A specialized deallocation vector is used by the instruction scheduler in order to indicate to the microprocessor which entries in the reservation station are free and which are taken. In prior art implementations, the microprocessor would scan, one by one, each entry in the deallocation vector to locate one particular free entry of the instruction scheduler in order to store recent instruction data. However, with the introduction of microprocessors having superscalar architecture, the microprocessor must be able to search, at the same instant, the deallocation vector for up to several free entries to store information regarding several instructions during the same clock cycle. Further, as the time period between clock cycles shortens as microprocessors become faster and faster, it is important that the deallocation vector be interrogated very quickly as to not delay the processing of the microprocessor. Also, prior art allocation systems that vacate entries in order are not practical for microprocessors that execute instruction out of program order. What is needed is an allocation scheme that operates for out of order execution.

Also, since microprocessors are can also be pipelined, the interrogation circuitry for determining the free vacancies for a current clock cycle must take into account the effects of allocations performed in previous pipestages that may not yet have become realized within the reservation station or its deallocation vector during the current cycle. The present invention provides circuitry for handling the above latency.

Prior art implementations that are used to search a deallocation vector in order to find vacancies within the instruction scheduler do not operate fast enough to complete processing within only one clock cycle (which may be on the order of $1/150^{th}$ of a microsecond) or within one half clock cycle (which may be $1/300^{th}$ of a microsecond) of modern superscalar microprocessors. It is not practical, given the environment of a pipelined microprocessor, to sequentially search each and every entry in a deallocation vector in order to discover, at the same instant, several vacant entries within the instruction scheduler. Since it is desired for pipelined microprocessors to execute portions of several instructions in parallel, it is unacceptable for there to be any delays associated with the search procedure of the deallocation vector of the instruction scheduler. This procedure must operate within a single clock cycle. Delays associated with such a task would reduce overall microprocessor efficiency and speed. Further, such processing delays may tend to eliminate the expansive advantages offered by microprocessors adopting pipeline architecture and associated microprocessor technology.

Therefore, what is desired is a processing scheme and apparatus that would allow very rapid searching of a deallocation vector in order to find, in one clock cycle, several vacant entries within an instruction scheduler. Further, what is needed is a processing scheme that allows interrogation of a deallocation vector taking into account, for a current clock cycle, the effects of allocations performed in previous pipestages that may not yet have become realized within the reservation station or its deallocation vector during the current cycle. The present invention offers such advantageous capability.

Accordingly, it is an object of the present invention to provide a method and apparatus for searching a deallocation vector, within a single clock cycle, in order to locate several vacancies within a reservation station of an instruction scheduler. It is further an object of the present invention to provide the interrogation of the deallocation vector and to provide free entries for allocation within a two cycle pipeline. It is an object of the present invention within this two cycle pipeline to account, within a current clock cycle, for the effects of allocations performed in previous pipestages that may not yet have become realized within the reservation station or its deallocation vector during the current cycle. Other objects of the present invention not specifically mentioned herein will become clear within the discussions herein.

SUMMARY OF THE INVENTION

A two cycle pipelined method and apparatus for allocating a number of vacant entries of a buffer resource and generating a set of enable vectors based thereon for a set of issued instructions is described. The procedure for determining the vacant entries and allocating them to the buffer resource is spread across two pipestages (clock cycles) of a pipelined superscalar processor. For each pipestage, the system receives information from the previous pipestage as to which entries were eligible for allocation, but have not yet received instruction information as well as a set of speculative stall vectors. For each pipestage, the reservation station informs the system as to which entries are vacant according to the reservation station's knowledge at that time; this is a preliminary deallocation signals. For each pipestage, the system also receives a list of the instructions for allocation to the reservation station for that cycle. The system formulates a modified deallocation vector from the above information and also performs stall checking in the event there are not enough vacant entries. The system interrogates the modified deallocation vector in order to locate the vacancies within the reservation station for storage of instruction information associated with several issued operations. A general static and dynamic approach are disclosed for performing the vacant entry identification at high speed within a single clock cycle. A superscalar microprocessor using the above may cycle schedule a group of instructions from the instruction decoder to the reservation station for subsequent execution.

Specifically, embodiments of the present invention utilize the general static or general dynamic vacancy search mechanism within a two cycle pipeline apparatus for allocating vacant entries of a buffer resource to instruction information relating to instructions for storage into the buffer resource of a pipelined superscalar microprocessor, the instructions received during the cycle n of the pipelined superscalar microprocessor, the apparatus including: a preliminary deallocation vector received during the cycle n and for indicating vacant entries within the buffer resource; circuitry for receiving a list of vacant entries during the cycle n allocated for the instructions received during the cycle n, the list of vacant entries generated by allocation circuitry during a cycle n−1 of the superscalar microprocessor; mask circuitry for masking those entries of the preliminary deallocation vector that correspond to entries of the list of vacant entries allocated for the instructions received during the cycle n, the mask circuitry generating a modified deallocation vector; and wherein the allocation circuitry, responsive to the modified deallocation vector, is also for generating, during cycle n, a list of vacant entries for instructions received during a cycle n+1. Embodiments of the present invention include the above and wherein the buffer resource is a reservation station for containing instruction information pending execution and wherein the preliminary deallocation vector is based on instruction information validly stored within or dispatched from the reservation station for the cycle n.

Embodiments of the present invention include the above and further comprising speculative stall circuitry operable during the cycle n−1 for generating speculative stall signals responsive to the list of vacant entries for instructions received during the cycle n that is generated by the allocation circuitry during the cycle n−1, the speculative stall signals indicating if the allocation circuitry failed to locate enough vacant entries to allocate to a maximum number of expected instructions to be received for the cycle n and further comprising: logic for determining which of the instructions received during the cycle n actually require an entry into the buffer resource; and stall circuitry for generating an allocation stall signal provided the logic for determining which of the instructions received during the cycle n actually requires an entry into the buffer resource and the speculative stall circuitry both indicate that an instruction of the cycle n requires a vacant entry and such entry is not available for the instruction.

The present invention also includes a computer system and method in accordance with the present invention as described in summary above.

BRIEF DESCRIPTION OF THE DRAWINGS

FIG. 1A illustrates an overall computer system within which the present invention may operate.

FIG. 1B illustrates a processor of the present invention.

FIG. 1C is an illustration of the an interface between the processor of the present invention and the instruction scheduler of the present invention.

FIG. 2 is an illustration of the deallocation vector and reservation station of the present invention.

FIG. 3 illustrates the deallocation vector and the 12 bitmap vectors generated at an intermediate step of the present invention within the instruction scheduler.

FIG. 4 illustrates the multiplexing operation of the present invention to create four enable vectors.

FIG. 6 illustrates the major processing tasks performed by the allocation circuit 35 of the present invention.

FIG. 7 illustrates the processing stages of the dynamic implementation of the present invention.

FIG. 9 is an illustration of processing tasks performed by the circuit of the present invention in relation to the internal two cycle pipeline used for resource allocation of the reservation station.

FIG. 10 is a logical block diagram illustrating logical component blocks of the circuit of the present invention for performing resource entry allocation of the reservation station to a set of instructions for a given clock cycle.

FIG. 11A illustrates circuitry of the present invention for performing a comparison of write enable bits against those needed for allocation to the reservation station as well as performing masking and other functions of the present invention in relation to a single entry of the reservation station.

FIG. 11B illustrates the circuit of FIG. 11C replicated for each entry of the reservation station in accordance with the present invention.

FIG. 12 illustrates the stall circuitry of the AL Stall block of the present invention.

DETAILED DESCRIPTION OF THE INVENTION

Figure 5:
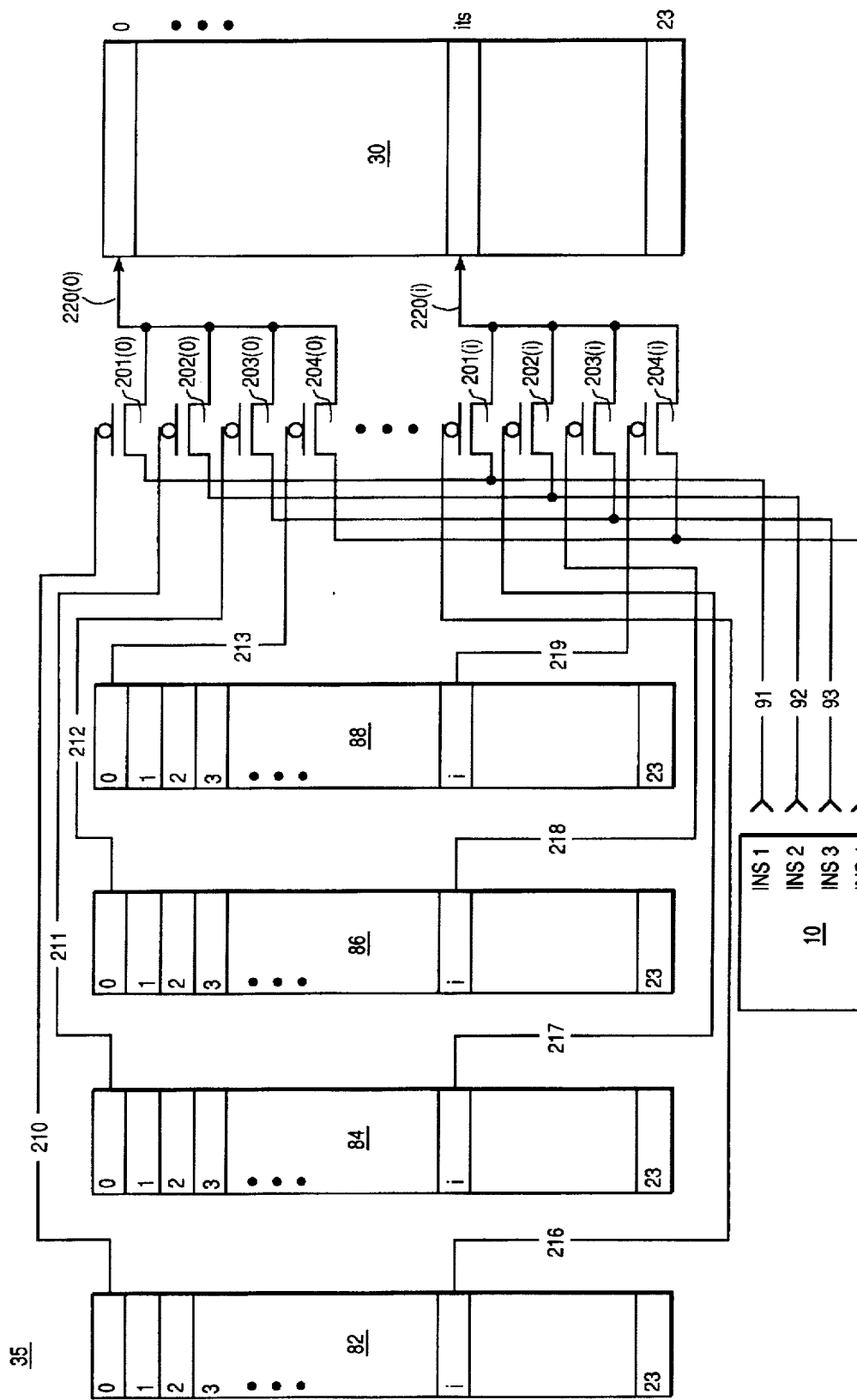
FIG. 5 illustrates coupling of the present invention between the four enable vectors, the reservation station memory and the instruction decoder.

In the following detailed description of the present invention, numerous specific details are set forth in order to provide a thorough understanding of the present invention. However, it will be obvious to one skilled in the art that the present invention may be practiced without these specific details. In other instances, well known methods, circuits, or components have not been described in detail as not to unnecessarily obscure the present invention. Throughout this detailed description, references are made to vectors. It is appreciated that all vectors of the present invention are implemented using either registers having a bit array or memory array components. That is, computation of vectors or utilization of specific vectors as related to the present invention is meant to refer to computation of or utilization of logical registers and/or physical memory locations constructed with hardware logic gates and physical quantities; to this extend, it is appreciated that the term "vector" is not meant to refer merely to a purely mathematical entity, but rather, what is meant is a vector implemented with specific hardware components and utilized by other hardware units to arrive at specific physical results and quantities.

I. INTRODUCTION

The present invention includes an apparatus and method for searching a deallocation vector in order to locate, within a half or single clock cycle, several vacancies within an reservation station for an allocation cycle (pipestage) of a processor's pipeline. The vacancies are allocated to a set of instructions and associated instruction information for this set of instructions that are issued within a common clock cycle and therefore need to be allocated within a common allocation cycle. Once the vacancies are found for a given allocation cycle, an instruction issue unit of a front end unit can then load the vacant entries of the reservation station with several instructions that are ready for execution. Aspects of the present invention may be combined with a reservation station used for instruction scheduling within a microprocessor. The present invention operates within one clock cycle (within an allocation cycle) so as to not delay the processing of a pipelined microprocessor.

As described herein, a general approach for performing vacant entry identification, consisting of both a static and a dynamic embodiment is disclosed. Also, a computer system and a microprocessor system, both of the present invention, utilizing the general approach is disclosed. As discussed generally herein the terminology "pipestage" refers to a clock cycle.

Two Cycle Pipeline Implementation

In addition, particular aspects of the present invention are discussed concerning a two cycle pipeline implementation of the resource allocation system. In practice, it may not be practical, within a single clock cycle, to determine which entries of the deallocation vector are empty and also assign these entries to a new set of uops (operations) and store this information into the buffer resource. Therefore, the present invention also includes performing the above tasks spanned over two pipestages of a two stage pipeline of a pipelined microprocessor. However, in advance of discussions concerning the two pipestage implementation, the general approaches are described. It is appreciated to note that while the general approach accepts a version of the deallocation vector directly from the reservation station 30, for a current clock cycle, the two cycle pipeline implementation of the present invention utilizes a modified version of the deallocation vector 40 which specifically takes into account effects of entry allocation that occurred in a previous clock cycle but have not yet altered the state of the reservation station for the current and subsequent clock cycle. This is the case since entries discovered in a particular clock cycle (n−1) by the allocation circuitry are assigned to uops that are received by the allocation circuitry in a subsequent cycle (n). All of the above will be described in further detail to follow.

Specifically, the general approach includes an embodiment of the present invention utilizing static BiCMOs technology to implement a priority encoding scheme and will be used to search for "1s" or "0s" in a bit string vector, the result of the search will be used to generate enables for a RAM array or reservation station. The general approach present invention is part static and part dynamic and generates 4 separate entry write enable vectors for the RAM in a very short period of time. The present invention is used to identify available RAM locations which are ready to receive instruction information. The present invention will directly activate write enable signals corresponding to the vacant entries of the RAM array. It is appreciated that the present invention can also be used to generate addresses of the vacant entries as well as directly activating write enables corresponding to these entries. Although embodiments of the present invention are described as operating with four entries and with vectors and buffers of predetermined size, it is appreciated that the present invention is scalable and can easily be extended to include different sizes of the RAM array and associated enable vector and can operate with more or fewer uops issued each clock cycle.

II. COMPUTER SYSTEM

Refer to FIG. 1A. The two cycle pipestage implementation of the present invention operates within a pipelined architecture microprocessor. Such a microprocessor may be utilized within a computer system. Therefore, the present invention may be advantageously utilized increase the performance of an overall computer system. A computer system used by the preferred embodiment of the present invention is illustrated in block diagram format in FIG. 1A. This computer system comprises a bus 100 for communicating information, a central processor 101 coupled with the bus for processing information and instructions, a random access memory 102 coupled with the bus 100 for storing information and instructions for the central processor 101, a read only memory 103 coupled with the bus 100 for storing static information and instructions for the processor 101, a data storage device 104 such as a magnetic or optical disk and disk drive coupled with the bus 100 for storing information and instructions, a display device 105 coupled to the bus 100 for displaying information to the computer user, an alphanumeric input device 106 including alphanumeric and function keys coupled to the bus 100 for communicating information and command selections to the central processor 101, a cursor control device 107 coupled to the bus for communicating user input information and command selections to the central processor 101, and a signal generating device 108 coupled to the bus 100 for communicating command selections to the processor 101.

It is appreciated that the microprocessor 101 advantageously utilized with the present invention, as described below, is a microprocessor having a pipelined architecture. Also, the microprocessor 101 may also be a superscalar microprocessor and may perform instructions out-of-order of their program sequence. Both of the above microprocessor types have the ability to execute portions of instructions or entire instructions in parallel. In either case or in both, the microprocessor must effectively deal with information regarding several instructions at the same time. The present invention may advantageously operate in conjunction with or as an integral part of these microprocessor types.

The display device 105 of FIG. 1A utilized with the computer system of the present invention may be a liquid crystal device, cathode ray tube, or other display device suitable for creating graphic images and alphanumeric characters recognizable to the user. The cursor control device 107 allows the computer user to dynamically signal the two dimensional movement of a visible symbol (pointer) on a display screen of the display device 105. Many implementations of the cursor control device are known in the art including a trackball, mouse, joystick or special keys on the alphanumeric input device 105 capable or signaling movement of a given direction or manner of displacement.

III. PROCESSOR

FIG. 1B illustrates a general block diagram of the processor 101 of the present invention. The components of the processor 101 are shown in FIG. 1B to provide the general structure and interface of the processor of the present invention. Generally, processor 101 is composed of an in-order portion 10 and an out-of-order portion 505 as shown. The branch target circuit 513, BTB cache 513a, branch instruction pointer 513b and the branch address calculator 513c perform speculative instruction execution by predicting program branch results to provide the pipeline with a steady source of instructions. The register alias table 514 performs register renaming and is the last stage of the in-order pipeline and subsequent to this stage instructions and association information are placed into the reservation station, RS, 30. Instructions that have been executed and are flowing from the out-of-order portion 505 retire to the real register file (RRF 506) in program code order if they are determined to be part of a properly predicted program pathway. The reorder buffer 507 contains information that may be part of a speculatively predicted branch. The out-of-order cluster 505 schedules operations for execution to the execution cluster 525, receives the results from the computations, and eventually updates the architecturally visible retirement register file (RRF) 506 with these results, assuming the computations are part of a properly predicted branch.

An external address and data bus 100, a writeback bus 508, dispatch bus 560, and internal bus 509 are also illustrated. The writeback bus 508 carries results of computations from the execution cluster 525 to the reorder buffer 507 which holds the results unit retirement. Dispatch bus 560 carries information relating to instructions dispatched from the reservation station to be executed within the execution cluster 525. Memory 512 (which may be of RAM 102 and/or ROM 103) for containing instruction and data information is coupled to bus 100 which is coupled to a bus interface unit 530.

The processor of FIG. 1B comprises instruction fetch 520 and decode 521 units with an integrated instruction cache 15 (shown in FIG. 1C). These instruction issue units are coupled to the bus interface 530 to receive instructions and data. The bus interface 530 is also coupled to a data cache memory. The instruction issue units (e.g., fetch and decode) are coupled to an allocator 550 which allocates entries of resource buffers, including the reorder buffer 507, the reservation station 30, and the register alias table 514. The entries of the reorder buffer 507 become vacant at the time of retirement and the entries of the reservation station become vacant at the time of dispatch. The allocator 530 and the instruction issue units are coupled to the RAT 514 which performs register renaming. The RAT 514 is coupled, via internal bus 509, to provide the reservation station 30 with instruction information for subsequent execution. The reservation station 30 is coupled to supply dispatched instruction information to the execution cluster 525, which includes an integer unit (IEU) 50a, a floating point unit (FEU) 50b, a memory unit (MIU) 50c, and an address generation unit (AGU) 50d.

The execution cluster 525 of the processor 101 includes execution units that hold and execute the integer and floating point instructions when their operand dependencies on execution results of preceding instructions are resolved, including those integer and floating point instructions that are speculatively fetched and issued. Similarly, the execution cluster 525 also includes a memory execution unit that holds, executes and dispatches load and store instructions to a data cache memory as soon as their operand dependencies on execution results of preceding instructions are resolved, including those load and store instructions that are speculatively fetched and issued.

The AGU 50d, IEU 50a, FEU 50b, and MIU 50d are all coupled to reservation station (RS) 30 via a dispatch bus 560. They are also coupled to writeback bus 508. RS 30 is coupled to the writeback bus 508 and the internal bus 509. The RS 30 is also coupled to ROB 507 and RRF 506. ROB 507 and RRF 506 are also coupled to the internal bus 509 and the writeback bus 508. Together, the above are coupled to hold, dispatch, execute and commit execution results of instructions. The instructions may be dispatched and executed out-of-order. Execution core 525 may include multiple IEUs, such as two, and multiple FEUs, such as two.

In operation, the instruction issue units 520 and 521 fetch instructions from an external memory, such as memory unit 512, through the bus interface 530 via bus 100. The fetched instructions are stored in an instruction cache 15 (shown in FIG. 1C). The bus interface 530 manages transfers of data between external components and the processor 101. In addition, it manages cache coherency transfers. The instruction issue units issue several instructions within a given clock cycle in program code order to the register alias table (RAT) 514 and the allocator 550.

The allocator 550 of the present invention interrogates a deallocation vector (generated by the reservation station 30) for vacant entries and from this vector assigns the issued instructions a vacant entry of the reservation station 30 for each uop. It is important that this interrogation of the deallocation vector to locate the vacant entries of the RS 30 is accomplished very rapidly, and not slower than one clock cycle. The allocator 550 also assigns each incoming uop (operation) to a vacant location (entry) in a reorder buffer (ROB) 507 and the RAT 514, thereby mapping the logical destination address (LDST) of the uop to a corresponding physical destination address (Pdst) in the ROB. A register alias table (RAT) 514 maintains this mapping for the most recently renamed logical destination registers. By renaming the registers used by the instructions to a larger set of physical registers that reside in the ROB, false data dependencies between instructions may be removed allowing additional parallel execution of instructions.

The out-of-order cluster 505 schedules the instructions for execution depending on data availability and other constraints. When the source data becomes available and an execution unit becomes free, an associated instruction within the reservation station 30 becomes eligible for dispatch to the execution cluster 525. The execution cluster 525 performs arithmetic and logic operations, such functions as add, subtract, logical AND, and integer multiply, as well as memory operations and returns the data to the out-of-order cluster 505. Some instructions are fetched and issued speculatively. The instruction issue units may issue a multiple number of instructions (e.g., 1, 2, 3, or 4) within a common clock cycle. Result data is then stored in the ROB 507.

The contents of a ROB register are retired to a location in a real register file (RRF) 506 in program code order when the register becomes part of a properly predicted program pathway. The ROB 507 maintains this program code order because the ROB 507 was filled by the in-order cluster 10. Since both the RRF 506 and the ROB 507 can be a source for operand data, the RAT 514 stores a real register file valid bit (RRFV) that indicates whether the value indicated by the logical address is to be found at the physical address in the ROB 507 or in the RRF 506 after retirement. Based upon this mapping, the RAT 514 also associates every logical source address to a corresponding location in the ROB 507 or the RRF 506 (the source operand of one instruction generally must have been the destination of a previous instruction).

RS 30 and ROB 507. Reservation station 30 of FIG. 1B receives and stores information pertaining to the issued instructions that are pending execution and resolves their operands with data from the IEU 50a, the FEU 50b, the data cache memory, the ROB 507 and RRF 506 and holds them until their operands are all resolved. The RS 30 then dispatches the issued instructions to the AGU 50d, the IEU 50a, the FEU 50b and the MIU 50c as appropriate. Each incoming uop is also assigned and written into an entry in the reservation station 30 by the allocator 550. The reservation station 30 assembles the instructions awaiting execution by an appropriate execution unit, such as integer execution unit. The use of register renaming in the ROB 507 not only avoids register resource dependencies to permit out-of-order execution, but also plays a role in speculative execution since the ROB contains only speculative data. If an instruction sequence is considered to be part of a predicted branch, then the execution of those instructions using the renamed registers in the ROB has no effect on the actual registers denoted by instruction. Thus, if it is determined that the branch was mispredicted, the results calculated and stored in the ROB may be erased and the pipeline flushed without affecting the actual registers found in the processor's register file (RRF). If the predicted branch affected the values in the RRF, then it would be difficult to recover from branch misprediction because it would be difficult to determine the values stored in the registers before the predicted branch was taken without the use of redundant registers in the ROB.

After execution within one of the execution units, when a result is produced, it is written to the ROB 507. The result may provide an input operand to one or more waiting instructions buffered in the reservation station, indicating that the source operand is ready for dispatch to one or more execution units along with the instructions using the operand. In the general case, instruction information held within the reservation station will source the ROB 507 to obtain operand data and this information is forwarded to the appropriate execution units for execution when an instruction is scheduled and dispatched. When the checking logic of the processor determines that a particular instruction is associated with a properly predicted branch, and all other conditions are satisfied, an instruction that has been executed and placed into the ROB 507 may retire. The associated physical register (Pdst) of that retiring instruction is then written into the RRF 506 and becomes architecturally visible. The IEU, FEU, and the MIU in turn perform their operations accordingly. The execution results of the integer, floating point and load instructions are held in the reorder buffer (ROB) 507, and then committed by RRF 506 in the order these instructions were issued. Speculative execution results of the mispredicted branches are not committed, but instead are held in the ROB 507 and deallocated upon their retirement.

Pipeline, Including Two Cycle Allocation. Regarding the structure of the present invention processor 101, the following terminology describes the relevant processing stages of the instructions. The Issue stage refers to the merging of the in-order stream of instructions from the issue cluster with the corresponding source data which is provided by the ROB 507 and then placing this information into the reservation station 30. A set of four, or fewer, instructions are issued within a common clock cycle. Within the issue stage, registers used by the instruction are renamed to registers within the ROB 507 and this renaming occurs within the RAT 514. At the Issue stage, instructions may be part of a speculative program path as a result of a branch prediction.

Also at the Issue stage, instruction information is allocated during two Allocation stages that make up a two cycle allocation pipeline. During Allocation (e.g., during a given or current allocation cycle), the allocator 550 determines which entries of the reservation station are vacant (e.g., which ones were dispatched previously) and assigns these vacant entries to the set of newly issued instructions. The present invention two pipestage implementation determines which entries are vacant during a current stage (n) and assigns them to uops received at the next subsequent stage (n+1).

The Ready/Schedule stage identifies all the instructions ready to execute (Ready stage) that are pending in the RS 30 a selects (Schedules) a group (e.g., by FIFO or similar process) for execution and also schedules an execution unit. For a given clock cycle, not all instructions that are ready are scheduled. At Dispatch, the scheduled instructions are forwarded to a selected execution (functional) unit. At Writeback, the results generated by the functional units are written into appropriate entries of the ROB 507. Also, the writeback ports are examined for results that are sources of instructions pending in the RS 30 so that the data-ready status of these pending instructions may be updated. At Retirement, the results from the ROB 507 that pertain to instructions that are properly predicted and also executed and placed into an architecturally visible buffer (the RRF) in their original issued order. Upon misprediction, the speculative data in the ROB 507 is cleared.

IV. INSTRUCTION SCHEDULER AND INTERFACE

Refer now to FIG. 1C which illustrates the instruction scheduler 20 of the present invention and its interface with the in-order cluster 10 of processor 101. An instruction cache unit 15 holds data regarding instructions for execution by the microprocessor 101 and is coupled to the in-order cluster 10 to supply instruction information; the instruction cache 15 may also be located within the issue units 520, 521. Instructions and associated instruction data fetched from the ROM 102 or RAM 103 are filled into the instruction cache unit 15 and the instruction cache unit 15 feeds current instructions and instruction data into the in-order cluster 10. The in-order cluster 10 of pipeline (or superscalar) microprocessor 101 will issue several instructions and associated data at the same time. The present invention operates within the environment wherein the in-order cluster 10 issues a set of up to four instructions and related data during a same clock cycle. It is appreciated that the system of the present invention can be extended to the cases where the instruction decoder issues more or less than four instructions simultaneously. Such extensions are within the scope of the present invention. It is appreciated that the in-order cluster 10 of the microprocessor of the present invention may issue instructions out of order of their original program sequence.

This is done in an effort to increase processing efficiency by increasing parallelism. Instructions or operations with true data dependencies may not be issued out of order.

The instruction information associated with the set of four instructions issued by the microprocessor 101 at the in-order cluster 10 are fed to an instruction scheduler 20 that includes the reservation station buffer 30. The instruction scheduler 20 will store the instruction information until needed and will schedule execution of these instructions to the several execution units 50a to 50c as needed. The reservation station 30, in one embodiment, is a static RAM array of memory. En one embodiment, this reservation station 30 contains 24 entries numbered 0 to 23. Each entry is approximately 100 to 200 bits wide and is designed to hold both an instruction and all the data required for execution of that instruction.

The instruction scheduler 20 also contains and generates a deallocation vector 40 for each allocation cycle that contains 24 entries numbered 0 to 23. Each entry is only 1 bit wide and corresponds to an entry of the RS 30. According to different embodiments of the present invention this vector may be larger or smaller depending on the selected length of the reservation station. The deallocation vector 40 of the present invention, for a given clock cycle, indicates which of the entries of the reservation station are vacant and ready to accept new instruction data and those that are filled and may not accept instruction data on this clock cycle.

However, for a given clock cycle, the deallocation vector 40 generated by the reservation station is not entirely up-to-date because there is a one cycle latency introduced inherently in the two cycle allocation pipeline of the present invention. This latency is dealt with by the present invention as described in Section VII. As discussed above, an entry of the RS becomes deallocated (e.g., vacant) upon dispatch of the instruction to the execution cluster 525. Each one bit entry within the deallocation vector 40 has an associated 200 bit wide entry of the reservation station. The first entry of the deallocation vector 40 indicates the vacancy for the first entry of the reservation station 30, the second entry of the deallocation vector indicates the vacancy for the second entry of the reservation station and so one respectively for all twenty four entries of the deallocation vector 40 and the reservation station 30.

According to the system of the present invention, a "1" marked in an entry of the deallocation vector indicates that the associated entry in the reservation station is vacant and may accept new instruction data. When an instruction becomes dispatched, its corresponding entry within the deallocation vector 40 is set to "1." When an instruction is allocated to an entry of the RS 30, its corresponding entry within deallocation vector 40 is reset to "0." Therefore, a "0" marked in an entry of the deallocation vector indicates that the associated entry in the reservation station is allocated, and may not accept new instruction data from the instruction decoder. It is appreciated that these bit markings can be switched within the present invention wherein "1" marks a full entry and "0" marks a vacant entry. Such modification would fall within the spirit and scope of the present invention. As data is placed into these entries of the reservation station, the representative entries of the deal location vector are marked to a "0." Similarly, as the data of these entries of the reservation stations are used and scheduled to the execution units, the corresponding entries of the deallocation vector are marked with a "1" to indicate the vacancy.

Within the instruction scheduler 20 of FIG. 1C, there is also a allocation circuit 35 of the present invention; it is appreciated that this circuitry 35 may be located within allocator 550 but is illustrated within the instruction scheduler 20 for convenience. The allocation circuit 35 of the present invention is responsible for interrogating the bits of the deallocation vector 40 for a given allocation cycle in order to locate entries of the reservation station 30 that are vacant for a set of instructions that are issued from the in-order cluster 10 for this given allocation cycle. This is done because the instruction issue units will supply information associated with four instructions for each clock cycle and these four instructions are to be stored within four vacant entries within the reservation station. The allocation circuitry 35 finds not only four vacant entries, but under the general embodiments, finds four vacant entries that have the highest priority. That is, the allocation circuitry 35 locates the first four vacant entries in the deallocation vector 40 starting from entry zero. Once the four entries are located, the allocation circuit 35 will generate four separate 24-bit enable vectors each having only one bit set. Each bit set corresponds to the location within the reservation station where a vacancy is located. These enable vectors are directly coupled to memory enable devices that will enable four locations within the reservation station 30 buffer to accept the pertinent information relating to the four instructions. Then these reservation station entries will be marked as allocated.

FIG. 1C also indicates that instruction execution units 50a, 50b, and 50c are coupled to the instruction scheduler 20. As stated above, the instruction scheduler 20 schedules instructions supplied by the in-order unit 10 to various instruction execution units. What is appreciated is that the present invention allocation circuit 35 will locate at least four vacancies within the reservation station static RAM 30 in which to place four instructions for scheduling to the execution units 50a, 50b, and 50c. For any given clock cycle, if the microprocessor 101 issues only three (or less) instructions, instead of four instructions, the present invention allocation circuit 35 will advantageously operate to store these three instructions utilizing the same circuitry that locates four vacancies. In this case, one vacancy will not be immediately filled and will remain vacant for the next clock cycle. Similarly, this capability can be extended to cases where the microprocessor issues only two instructions or one instruction at any given clock cycle. In all of these cases the present invention will operate to locate vacancies within the reservation station using the same circuitry developed to locate four vacancies within the reservation station 30.

Deallocation Vector. FIG. 2 illustrates a more detailed diagram of the deallocation vector 40 and the reservation station 30. In a particular embodiment, the deallocation vector is made up of 24 entries numbered zero to twenty-three and is only one bit wide but may vary in entry number as needed; the same is true for the RS 30. Each entry of the deallocation vector 40 is considered a pointer to a corresponding entry with the same number of the reservation station 30. The pointer indicates whether or not the corresponding entry in the reservation station is vacant or allocated. However, in the two cycle pipeline implementation of the present invention, the deallocation vector 40 contains at least one cycle of inherent latency; in this embodiment the vector 40 is interrogated during a given clock, n, to discover vacancies and these are allocated to uops during the next clock cycle n+1. Therefore, the reservation station discovers which entries were allocated to a set of uops (e.g., during cycle n+1) one clock cycle after they were eligible for allocation (at cycle n). The reservation station 30 is a static RAM memory array having twenty-four entries numbered zero to twenty-three. Each entry is from 100 to 200 bits wide. Each entry may hold the instruction and its associated data for execution by the execution units. Using the deallocation vector and the reservation station, the present invention, under the general embodiments, searches the deallocation vector to locate the entries containing the first four "1s" of the vector.

The major processing tasks performed by the allocation circuit 35 of the general static embodiment of the present invention in order to locate the first four "1s" of the deallocation vector are three fold. First, the allocation circuit 35 generates a set of twelve bitmap vectors by examining the deallocation vector 40. Second, the present invention allocation circuit 35 will multiplex these twelve bitmap vectors to create four separate 24-bit enable vectors, each having at most one bit set within the vector. Third, the present invention will utilize the four separate 24-bit enable vectors to directly enable four memory locations within the reservation station 30 for storage of the instruction data. Lastly, the present invention will update the status of the deallocation vector 40 to reflect that these four memory locations are no longer vacant but hold valid instruction data. A general dynamic embodiment is also disclosed.

In addition, in accordance with the two cycle pipeline implementation of the present invention, the deallocation vector 40 from the reservation station is altered to account for the inherent one cycle latency of allocation information. This modified vector is then input to the deallocation circuit 35. This is described further in Section VII.

V. STATIC GENERAL EMBODIMENT

The following discussion illustrates the general static implementation of the present invention four entry allocation mechanism. In this general embodiment, the searching processes is divided into three processes and looks for available entries in each group having 8 bits. Since up to four instructions (uops) need to be allocated on each cycle, each vector looks for an available entry in the group of 8. This process first generates 12 bitmaps, out of which four are selected using a priority multiplexer. This embodiment is static in so far as the generation of the 12 bitmaps is done in a static fashion. The muxing is done on the rising clock edge using a dynamic circuit. The 4 bitmaps that directly activate the write enables of the reservation station are then generated.

Generation of the Twelve Bitmap Vectors 300–311

FIG. 3 illustrates the procedure implemented by the general static embodiment of the allocation circuit 35 present invention that performs the first step of generating the twelve bitmap vectors 300–311. Each of the twelve bitmap vectors is eight bits long and all twelve are organized according to sets of three bitmap vectors. Them are four sets of three. Each set of three corresponds to a separate issued instruction, therefore there are four separate sets of three. Within a particular set, each vector corresponds to a separate portion (40a, 40b, 40c) of the deallocation vector 40. Each bitmap vector of a set is simultaneously generated, and the sets are sequentially generated, that is, the deallocation circuit 35 first simultaneously generates bitmap vectors 300, 304 and 308. Next, 301, 305 and 309 are simultaneously generated and then bitmap vectors 302, 306 and 310 are simultaneously generated by the allocation circuit 35 of the present invention. Lastly, bitmap vectors 303, 307 and 311 are simultaneously generated by the allocation circuit 35. Note that bitmap vectors 300, 304 and 308 make up 24-bit vector 42, vectors 301, 305 and 309 make up 24-bit vector 44. Vectors 302, 306 and 310 constitute 24-bit vector 46 and lastly vectors 303, 307, and 311 comprise 24-bit vector 48.

According to the method of the circuitry of the present invention, vector 42 is generated first, followed by vector 44, 46 and then vector 48. Initially all the bits of the vectors 300–311 are reset to zero.

Note that the deallocation vector 40 is separated into three 8-bit sections numbered 40a, 40b and 40c. Bitmap vectors 300, 301, 302, and 303 will search vector section 40a in respective priority in order to locate and take a 1 of vector section 40a. Vector 300 takes the first 1 (if there is one at all), vector 301 the second (if a second exists), 302 the third (if a third exists) and 303 the fourth 1 (if a fourth exists). Similarly, vectors 304, 305, 306, and 307 search vector section 40b with bitmap vector 304 taking the first 1 of section 40b, 305 the second, 306 the third, and 307 the fourth 1. Bitmap vectors 308, 309, 310, and 311 search vector section 40c with bitmap vector 308 taking the first 1 of section 40c, 309 the second, 310 the third, and 311 the fourth 1. The present invention operates such that each bitmap vector that searches a particular vector section (40a, 40b, or 40c) processes on a priority scheme with the previous bitmap vector having higher priority to take an available one. Note that each bitmap vector may take only a single available 1 from any section of the deallocation vector 40.

More specifically, the circuitry of the general static embodiment of the present invention is implemented such that 8-bit vector 300 of FIG. 3 will contain a 1 in an entry (0 to 7) corresponding to the first 1 found in the entries (0 to 7) of section 40a of deallocation vector 40. If no 1 is found in section 40a then all of the bits of vector 300 will be zero. Similarly, vector 304 will contain a 1 in an entry (8 to 15) representing the first entry having a 1 in section 40b of the deallocation vector. If no 1 is found in section 40b then all of the bits of vector 304 will be zero. Lastly, bitmap vector 308 will be given a one in an entry (16 to 23) representing the first occurrence of a 1 within the entries of section 40c of the deallocation vector. If no 1 is found in section 40c then all of the bits of vector 308 will remain zero. The processing of the circuitry within the allocation circuit 35 that generates vectors 300, 304 and 308 occurs in parallel. The logic gates utilized to implement these functions may be any that conform to the above specified procedures and conditions as long as the bitmap vector 301–311 are generated as specified above.

The general static embodiment of the present invention first determines bitmap vectors 300, 304 and 308 of FIG. 3. An example is given of the logic conditions and logic gates that can be used to implement the procedure utilized by the present invention to determine the bit set in each vector 300, 304 and 308. First, entry 0 of vector 300 will be a 1 if entry 0 of vector 40 is a 1. Second, entry 1 of vector 300 will be a 1 if entry 1 of vector 40 is a 1 and entry 0 of vector 40 is a 0 because if entry 0 of vector 40 was a 1 then vector 300 already will have an entry set to one and each vector 300–311 can only take a single 1. Since vector 300 is satisfied, entry 1 will remain zero. Third, entry 2 of vector 300 will be a 1 if entry 2 of vector 40 is a 1 and entries 0–1 of vector 40 are zero. Fourth, entry 3 of vector 300 will be a 1 if entry 3 of vector 40 is a 1 and entries 0–2 of vector 40 are zero. Fifth, entry 4 of vector 300 will be a 1 if entry 4 of vector 40 is a 1 and entries 0–3 of vector 40 are zero. Sixth entry 5 of vector 300 will be a 1 if entry 5 of vector 40 is a 1 and entries 0–4 of vector 40 are zero. Seventh, entry 6 of vector 300 will be a 1 if entry 6 of vector 40 is a 1 and entries 0–5 of vector 40 are zero. Eighth, entry 7 of vector 300 will be a 1 if entry 7 of vector 40 is a 1 and entries 0–6 of vector 40 are zero. Each of the above eight conditions occurs simultaneously and is implemented by standard logic circuits within the present invention. It should be noted that the above conditions equally apply to bitmap vectors 304 and 308 where bitmap vector 304 is generated based on vector section 40b while bitmap vector 308 is generated based on vector section 40c.

Utilizing the above eight conditions for each bitmap vector (300, 304, and 308) and employing AND gates, OR gates, other logic gates, and latches to create an 8-bit register for vectors 300, 304, and 308, circuitry of the present invention allocation circuit 35 can be generated. It is appreciated that any number of different, specific, implementations of logic can be supplied to accomplish the above tasks of the present invention. What is important is the overall procedure executed by the present invention to arrive at the values of vector 300 and the other bitmap vectors 301-311. Similarly, employing the conditions as expressed above, entries of the bitmap vector 304 are respectively generated based on the entries of section 40b and the entries of bitmap vector 308 are respectively generated by the present invention based on entries of section 40c of the deallocation vector 40. It is appreciated that specific implementation logic is described in Tables 1–4 that provide the logical conditions for bitmap vectors 300-303 and extend to bitmap vectors 304-311.

The entries of vectors 301, 305 and 309 are next computed by the allocation circuitry 35 of the present invention. Since each bitmap vector takes 1s of its associated section (40a, 40b, or 40c) in a priority scheme, the value given to bitmap vector 301 will be determined based on the value of bitmap vector 300 and the values of vector 40a. Bit map vector 302 will be a function of vector section 40a, vector 301 and vector 300. Bit map vector 303 will be a function of vector 302, 301 and 300 and section 40a. That is, bitmap vector 301 cannot take the first 1 present in section 40a, this one belongs to vector 300. Vector 301 can only take the second 1 found in section 40a. Likewise, vector 302 takes only the third 1 found in section 40a while section 303 can only take the fourth 1 found in section 40a.

A typical implementation of the logic required to construct the entries for vectors 301-303 is given. Entry 0 of vector 301 can never be 1 because this would mean that entry 0 of vector 40 was a 1 and therefore entry 0 of the higher priority vector 300 would have already taken this 1. Entry 1 of vector 301 may be 1 if entry 1 of vector 40 is the second 1 of vector 40a, that is, entry 0 of vector 40 was also a 1. Entry 2 of vector 301 may be a 1 if entry 2 of vector 40a is the second 1 of vector 40a. Likewise, entry n (3 to 7) of vector 301 may be a 1 if entry n (3 to 7) of vector 40a is the second 1 of vector 40a. Similarly, with regard to vector 302, entries 0 and 1 can never be a 1 because vectors 300 and 301 would have taken the 1 before. For the remainder of the entries (2 to 7), an entry n, will only be a one if it is the third one of section 40a. With regard to vector 303, entries 0-2 can never be a 1 because vectors 300, 301 or 302 would have taken the 1 before. For the remainder of the entries (3 to 7), an entry n of vector 303, will only be a one if it is the third one of section 40a. Thus, vector 300 is a function of vector 40a, that is, vector 300=f(40a); vector 301=f(300, 40a); vector 302=f(301, 300, 40a); and vector 303=f(302, 301, 300, 40a).

The remainder of the vectors 304 to 307 of FIG. 3 are computed by the present invention similarly to vectors 300 to 303 but vector section 40b is analyzed instead of vector section 40a. And vectors 308 to 311 are computed by the present invention similarly to vectors 300 to 303 but vector section 40c is analyzed instead of vector section 40a. That is vector 304 takes the first 1 of section 40b, if any, vector 305 the second one of section 40b, if any, vector 306 the third one, if any, and lastly vector 307 takes the fourth one, if any. Vector 308 takes the first 1 of section 40c, if any, vector 309 the second one of section 40c, if any, vector 310 the third one, if any, and lastly vector 311 takes the fourth one, if any.

A specific implementation of the logical conditions of the general static embodiment of the present invention allocation circuitry 35 is disclosed. The conditions are implemented using AND and OR logic gates (NAND and NOR) and other transistor logic in hardware form or could be implemented via PAL or PROM logic. It is appreciated that the present invention is not limited to such specific implementation as there are numerous implementations available to provide the above procedures to arrive at the bitmap vectors 300-311. The logical conditions utilized by the present invention in order to realize the circuitry of the allocation circuit 35 for bitmap vectors 300, 301, 302 and 303 are presented below in the following Tables 1–4 respectively. These tables illustrate the logical conditions utilized by the present invention to arrive at each entry of bitmap vectors 300-303 given the values of the entries of vector segment 40a as an input (i.e., a0 to a7). It is appreciated that these logical conditions disclosed can easily be extended to apply to the generation of the other bitmap vectors 304-311 by referencing the entries of vector sections 40b (for vectors 304-307) and the entries of vector segment 40c (for vectors 308 to 311 ) instead of section 40a. In the following tables the terminology a0 to a7 refers to the entries 0 to 7 of the allocation vector 40. To determine the values of vectors 304 to 307 utilize entries 8 to 15 of the deallocation vector 40 and similarly to compute the values for vectors 308 to 311 utilize entries 16 to 23 of the deallocation vector 40.

Where:

Rg00=Vector 300 allocated at least one entry of 0–3 entries

Rg10=Vector 300 allocated at least one entry of 4–7 entries

Rg01=Vector 301 allocated at least one entry of 0–3 entries

Rg11=Vector 301 allocated at least one entry of 4–7 entries

Rg02=Vector 302 allocated at least one entry of 0–3 entries

Rg12=Vector 302 allocated at least one entry of 4–7 entries

Rg03=Vector 303 allocated at least one entry of 0–3 entries

Rg13=Vector 303 allocated at least one entry of 4–7 entries

TABLE 1

| Logical Conditions for Bitmap Vector 300: |
| --- |
| Entry 0 = $a_0$ |
| Entry 1 = $(\bar{a}_0 \cdot a_1)$ |
| Entry 2 = $(\bar{a}_0 \cdot \bar{a}_1 \cdot a_0)$ |
| Entry 3 = $(\bar{a}_0 \cdot \bar{a}_1 \cdot \bar{a}_2 \cdot a_3)$ |
| Entry 4 = $\overline{Rg00} \cdot a_4$ |
| Entry 5 = $\overline{Rg00} \cdot (\bar{a}_4 \cdot a_5)$ |
| Entry 6 = $\overline{Rg00} \cdot (\bar{a}_4 \cdot \bar{a}_5 \cdot a_6)$ |
| Entry 7 = $\overline{Rg00} \cdot (\bar{a}_4 \cdot \bar{a}_5 \cdot \bar{a}_6 \cdot a_7)$ |

TABLE 2

Logical Conditions for Bitmap Vector 301:

Entry 0 = 0
Entry 1 = $a_0 \cdot a_1$
Entry 2 = $(\bar{a}_0 \cdot a_1 + a_0 \cdot \bar{a}_1) \cdot a_2$
Entry 3 = $(a_0 \cdot \bar{a}_1 \cdot \bar{a}_2 + \bar{a}_0 \cdot a_1 \cdot \bar{a}_2 + \bar{a}_0 \cdot \bar{a}_1 \cdot a_2) \cdot a_3$
Entry 4 = $\overline{Rg\emptyset\emptyset} \cdot \overline{Rg\emptyset 1} \cdot a_4$
Entry 5 = $\overline{Rg\emptyset\emptyset} \cdot a_4 \cdot a_5 + Rg\emptyset\emptyset \cdot \bar{a}_4 \cdot a_5$
Entry 6 = $\overline{Rg\emptyset 1} \cdot [\bar{a}_4 \cdot a_5 + a_4 \cdot \bar{a}_5] \cdot a_6 \cdot \overline{Rg\emptyset\emptyset} + Rg\emptyset\emptyset \cdot \overline{Rg\emptyset 1} \cdot \bar{a}_4 \cdot \bar{a}_5 \cdot a_6$
Entry 7 = $\overline{Rg\emptyset 1} \cdot [\bar{a}_4 \cdot \bar{a}_5 \cdot a_6 + a_4 \cdot \bar{a}_5 \cdot a_6 + \bar{a}_4 \cdot a_5 \cdot \bar{a}_6] \cdot a_7$

TABLE 3

Logical Conditions for Bitmap Vector 301:

Entry 0 = 0
Entry 1 = 0
Entry 2 = $a_0 \cdot a_1 \cdot a_2$
Entry 3 = $(a_0 \cdot a_1 \cdot \bar{a}_2 + a_0 \cdot \bar{a}_1 \cdot a_2 + \bar{a}_0 \cdot a_1 \cdot a_2) \cdot a_3$
Entry 4 = $Rg\emptyset\emptyset \cdot Rg\emptyset 1 \cdot \overline{Rg\emptyset 2} \cdot a_4$
Entry 5 = $(\overline{Rg\emptyset 2} \cdot Rg\emptyset\emptyset \cdot Rg11) \cdot \bar{a}_4 \cdot a_5$
Entry 6 = $[Rg\emptyset\emptyset \cdot \overline{Rg\emptyset 1}[\bar{a}_4 \cdot \bar{a}_5 + \bar{a}_4 \cdot a_5] + Rg\emptyset\emptyset \cdot Rg\emptyset 1 \cdot \bar{a}_4 \cdot \bar{a}_5 + Rg\emptyset\emptyset \cdot Rg\emptyset 1 \cdot \overline{Rg\emptyset 2} \cdot \bar{a}_4 \cdot \bar{a}_5] \cdot a_6$
Entry 7 = $[Rg\emptyset\emptyset \cdot Rg\emptyset 1 \cdot \overline{Rg\emptyset 2} \cdot \bar{a}_4 \cdot \bar{a}_5 \cdot \bar{a}_0 + Rg\emptyset\emptyset \cdot \overline{Rg\emptyset 1} \cdot [\bar{a}_4 \cdot \bar{a}_5 \cdot a_6 + \bar{a}_4 \cdot a_5 \cdot a_6 + a_4 \cdot \bar{a}_5 \cdot a_6] + Rg\emptyset\emptyset \cdot [\bar{a}_4 \cdot a_5 \cdot a_6 + \bar{a}_4 \cdot a_5 \cdot a_6 + a_4 \cdot \bar{a}_5 \cdot a_6]] \cdot a_7$

TABLE 4

Logical conditions for bitmap vector 303:

Entry $\emptyset$ = 0
Entry 1 = 0
Entry 2 = 0
Entry 3 = $a_0 \cdot a_1 \cdot a_2 \cdot a_3$
Entry 4 = $Rg\emptyset\emptyset \cdot Rg\emptyset 1 \cdot Rg\emptyset 2 \cdot \overline{Rg\emptyset 3} \cdot a_4$
Entry 5 = $Rg\emptyset\emptyset \cdot Rg\emptyset 1 \cdot Rg\emptyset 2 \cdot \overline{Rg\emptyset 3} \cdot \bar{a}_4 \cdot a_5$
Entry 6 = $[Rg\emptyset\emptyset \cdot \overline{Rg\emptyset 1} \cdot Rg\emptyset 2 \cdot \overline{Rg\emptyset 3} \cdot \bar{a}_4 \cdot \bar{a}_5 + Rg\emptyset\emptyset \cdot \overline{Rg\emptyset 1} \cdot \overline{Rg\emptyset 2} \cdot [\bar{a}_4 \cdot a_5 + a_4 \cdot \bar{a}_5] + Rg\emptyset\emptyset \cdot \overline{Rg\emptyset 1} \cdot a_4 \cdot a_5] \cdot a_6$
Entry 7 = $[Rg\emptyset\emptyset \cdot \overline{Rg\emptyset 1} \cdot Rg\emptyset 2 \cdot \overline{Rg\emptyset 3} \cdot \bar{a}_4 \cdot \bar{a}_5 \cdot \bar{a}_6 + Rg\emptyset\emptyset \cdot \overline{Rg\emptyset 1} \cdot \overline{Rg\emptyset 2}[a_4 \cdot \bar{a}_5 \cdot \bar{a}_6 + \bar{a}_4 \cdot a_5 \cdot a_6 + \bar{a}_4 \cdot a_5 \cdot \bar{a}_6] + \overline{Rg\emptyset\emptyset} \cdot \overline{Rg\emptyset 1}[a_4 \cdot a_5 \cdot \bar{a}_6 + \bar{a}_4 \cdot a_5 \cdot a_6 + a_4 \cdot \bar{a}_5 \cdot a_6] + \overline{Rg\emptyset\emptyset} [a_4 \cdot a_5 \cdot a_6]] \cdot a_7$ A few examples are presented. Assume that the deallocation vector contains four 1s and they are set at entries: 4, 5, 15, and 20 of the vector. Therefore, section 40a contains two 1s, section 40b contains one of the 1s, and section 40c contains the other. The allocation circuitry 35 will process the deallocation vector 40 according to the logical conditions above and bitmap vector 300 will have a one 1 set in entry 4 by taking the first 1. Bitmap vector 301 will take the second 1 of 40a and entry 5 will be set in this vector. Vectors 302 and 303 will remain zero. Bitmap vector 304 will have entry 15 set as it takes the only 1 of 40b. Bitmap 308 takes the only one of 40c and entry 23 is set. Vectors 305 to 307 and 309 to 311 will remain set at zero. According to the timing scheme of the present invention, vectors 300, 304 and 308 are computed first, then vectors 301, 305 and 309, then 302, 306 and 310 and lastly 303, 307 and 311. Assume next that the allocation vector 40 had four 1s set in entries: 9, 10, 11, and 12 so that all the 1s were in section 40b. In this case vectors 300 to 303 would remain zero. Vectors 304, 305, 306 and 307 would each have a single bit set in each vector at the entries 9, 10, 11 and 12 respectively. Vectors 308 to 311 would remain zero as no 1s would be in section 40c.

Multiplexing the Bitmap Vectors to Generate the Enable Vectors

FIG. 4 illustrates the next processing step of the general static embodiment of the present invention allocation circuit 35. FIG. 4 illustrates the 12 bitmap vectors 300–311 entering a multiplexing circuit 75 which produces four enable vectors 82, 84, 86, and 88 as an output. The multiplexing circuit 75 is part of the allocation circuit 35 of the present invention. After the twelve bitmap vectors 300–311 are generated, the present invention signals the multiplexing circuit 75 to generate four 24-bit enable vectors 82, 84, 86 and 88 each having only one bit set. These enable vectors will be tied directly to write enable gates of the reservation station 30 entries. The general static embodiment of the present invention will read the status of the twelve vectors 300–311 and pass them through a specialized multiplexer circuit 75 which will generate an output of four 24-bit enable vectors, each enable vector having only 1 bit set. The enable vectors will each take the highest priority of the 1s found within the bitmap vectors. Therefore, if the deallocation vector 40 had 1s set in the following entries: 4, 10, 18, and 23 then enable vector 82 would have entry 4 set to 1 and all other entries set to zero, enable vector 84 would have entry 10 set to 1 with others zero, enable vector 86 would have entry 18 set to 1 with others zero and lastly enable vector 88 would have entry 23 set to 1 with others set to zero.

The processing strategy of the multiplexing circuit 75 is to examine the 12 bitmap vectors 300–311 and to take the highest priority of the 1s set according to vectors 42, 44, 46, and 48. Because of the allocation system of the present invention that generated vectors 42, 44, 46, and 48, there may be more than a single 1 within any given vector. The enable vectors 82, 84, 86, and 88 only will contain a single 1, at most, within each vector. Therefore, each of the enable vectors will be generated by first searching bitmap vectors 42, 44, 46, and 48 and taking the highest priority 1 found in the first entry number. If multiple 1s are found in a particular bitmap vector, then the second 1 can be used to generate the next enable vector. Therefore, if two 1s exist within bitmap vector 42 then the first 1 can be used to form enable vector 82 while the second 1 can be used to form enable vector 84 depending on the priority of the that 1 or other 1s within bitmap vector 44. It should be noted that the present invention locates the first four 1s within the deallocation vector 40, so allocation priority is very important to the processing of the present invention.

According to the processing logic of the general static embodiment of the present invention, enable vector 82 will select from bitmap vector 42. Enable vector 84 will select from bitmap vector 44 and any carryovers from bitmap vector 42. Enable vector 86 will select from bitmap vector 46 and any carryovers from bitmaps 42 and 44. Lastly, enable vector 88 will select from bitmap vector 48 and any carryovers from bitmap vectors 42, 44 or 46.

Therefore, the multiplexing circuit 75 of the FIG. 4 performs two basic functions. First, for any given bitmap vector 42, 44, 46, or 48, the present invention selects bitmap vector 300–311 containing the highest priority 1 (measured by the entry with the lowest number) and equates that bitmap vector with an associated enable vector 82, 84, 86, and 88. Second, if there are remainder 1s set in a particular bitmap vector 42, 44, 46, or 48, then they are made available for the next bitmap vector in priority. For example, assume that bitmaps 300 (entry 3), 304 (entry 10) and 309 (entry 22) are set with a 1 while vectors 301, 305, and 308 are zero. The multiplexing circuits would place the 1 of bitmap 300 into enable vector 82 at entry 3 and enable vector 82 would be complete. Next, the circuits 75 would make the 1 of bitmap vector 304 available for the selection of enable vector 84. Enable vector 84 can therefore select either bitmap 304 (entry 10) or bitmap 309 (entry 22). Because the entry at 10 is of higher priority than entry 22, the present invention constructs enable vector 84 with bitmap 304 (entry 10) and carry forward bitmap 309 to the processing for enable vectors 86 and 88 depending on the state of the other bitmap vectors 302–303, 306–307 and 310–311. In so doing the present invention constructs the enable vectors 82, 84, 86, and 88 by prioritizing the enable bits.

For instance, generation of enable vector 82 of FIG. 4 is the most straight forward. Enable vector 82 will take the 1 of the entry of bitmap vector 300 if there is a one in that bitmap vector. Enable vector 82 will take the 1 of the entry of bitmap vector 304 if there is a bit in that bitmap and if bitmap vector 300 is zero. Enable vector 82 will take the 1 of the entry of bitmap vector 308 if there is a one in that bitmap vector and if bitmap vector 300 is zero and if bitmap vector 304 is zero. Table 5 illustrates the specific logical conditions executed by the present invention allocation circuit 35 to perform the multiplexing operations done in multiplexing circuit 75. It is appreciated that the present invention implements these logical conditions with logic gates, registers, and other hardware components. It is further appreciated that a number of specific logic implementations of the below equations can be accomplished and these would come within the scope of the present invention.

According to the terminology of Table 5, the following terms are utilized:

$V_0$=a bit is set in bitmap vector 300

$V_1$=a bit is set in bitmap vector 301

$V_2$=a bit is set in bitmap vector 302

$V_3$=a bit is set in bitmap vector 303

$V_4$=a bit is set in bitmap vector 304

$V_5$=a bit is set in bitmap vector 305

$V_6$=a bit is set in bitmap vector 306

$V_7$=a bit is set in bitmap vector 307

$V_8$=a bit is set in bitmap vector 308

$V_9$=a bit is set in bitmap vector 309

$V_{10}$=a bit is set in bitmap vector 310

$V_{11}$=a bit is set in bitmap vector 311
and

BMVn=the bitmap of vector n

As the logic conditions of Table 5 illustrate, each of the entry vectors 82, 84, 86 and 88 can be generated by the present invention multiplexing circuits 75 in parallel. That is, the enable vectors are not functions of each other, but rather, they are functions of the bitmap vectors 300–311. Therefore, the logic required to construct the enable vectors that operates within the multiplexing circuits 75 performs simultaneously to generate the four enable vectors once the bitmap vectors 300–311 have been generated by other hardware of the allocation circuitry 35. Once the enable vectors are generated, they are utilized the further circuitry of the present invention in order to allow the four instructions and associated information to be placed in the four indicated vacant entries of the reservation station 30.

Enabling of the Reservation Station 30

Refer to FIG. 5 which illustrates the circuitry of the present invention that enables the reservation station 30 to accept the instructions and associated information that are issued by the microprocessor 101 and sent from the instruction decoder 10. The circuitry of FIG. 5 may be employed with each of the embodiments of the present invention as described herein. The circuits of FIG. 5 enable any one of the instructions presented at lines 91–94 to be routed to any of the 24 entries of the reservation station 30 depending on those indicated as vacant by the deallocation vector 40. Each of the 24 bit enable vectors 82, 84, 86, and 88 are coupled to the reservation station 30 via four sets of 24 enable pass gates. For any given instruction, there are 24 different pass gates which will couple that instruction to one of the entries of the reservation station 30. Each instruction 1–4 has a separate enable vector 82, 84, 86, or 88 which will act to couple the instruction to the reservation station. Enable vector 82 couples instruction 1, enable vector 84 couples instruction 2, enable vector 86 coupled instruction 3 and enable vector 88 couples instruction 4. It is appreciated that the enable circuitry of FIG. 5 may be located within the reservation station in the preferred embodiment of the present invention. In other embodiments of the present invention, the enable circuitry of FIG. 5, except for reservation station 30 and the instruction decoder 10, are located within the allocation circuit 35.

TABLE 5

Generation of the Enable Vectors:

Enable Vector 82 =
$$BMV_{300} \cdot V_0 + BMV_{304} \cdot V_4 \cdot \bar{V}_0 +$$
$$BMV_{308} \cdot V_8 \cdot \bar{V}_4 \cdot \bar{V}_0$$

Enable Vector 84 =
$$BMV_{301} \cdot V_1 + [BMV_{304} \cdot V_0 \cdot V_4 + BMV_{305} \cdot V_5 \cdot \bar{V}_0 +$$
$$BMV_{308} \cdot (\bar{V}_0 \cdot \bar{V}_4 + V_0 \cdot V_4) \cdot \bar{V}_5 \cdot V_8 +$$
$$BMV_{309} \cdot V_9 \cdot \bar{V}_0 \cdot \bar{V}_4] \cdot \bar{V}_1$$

Enable Vector 86 =
$$BMV_{302} \cdot V_2 + BMV_{304} \cdot V_4 \cdot V_1 \cdot \bar{V}_2 + BMV_{305} \cdot V_5 \cdot V_0 \cdot \bar{V}_1 +$$
$$BMV_{306} \cdot V_6 \cdot \bar{V}_0 +$$
$$BMV_{308} \cdot V_8 \cdot (\bar{V}_0 \cdot \bar{V}_1 \cdot V_4 \cdot \bar{V}_5 + V_1 \cdot \bar{V}_2 \cdot \bar{V}_4) +$$
$$BMV_{309} \cdot V_9(\bar{V}_0 \cdot \bar{V}_1 \cdot \bar{V}_4 + \bar{V}_0 V_4 \cdot \bar{V}_5) +$$
$$BMV_{310} \cdot V_{10} \cdot \bar{V}_0 \cdot \bar{V}_4$$

Enable Vector 88 =
$$BMV_{303} \cdot V_3 + BMV_{304} \cdot V_2 \cdot \bar{V}_3 \cdot V_4 +$$
$$BMV_{305} \cdot V_1 \cdot \bar{V}_2 \cdot V_5 +$$
$$BMV_{306} \cdot V_0 \cdot \bar{V}_1 \cdot V_6 + BMV_{307} \cdot \bar{V}_0 \cdot V_7 +$$
$$BMV_{308} \cdot V_8 \cdot (V_2 \cdot \bar{V}_3 \cdot \bar{V}_4 + V_1 \cdot \bar{V}_2 \cdot V_4 \cdot \bar{V}_5 +$$
$$\bar{V}_0 \cdot \bar{V}_1 \cdot V_5 \cdot \bar{V}_6 + \bar{V}_0 \cdot V_6 \cdot \bar{V}_7) +$$
$$BMV_{309} \cdot V_9 \cdot (\bar{V}_1 \cdot \bar{V}_2 \cdot \bar{V}_4 + V_0 \cdot \bar{V}_1 \cdot V_4 \cdot \bar{V}_5 + \bar{V}_0 \cdot V_5 \cdot \bar{V}_6) +$$
$$BMV_{310} \cdot V_{10} \cdot (\bar{V}_1 \cdot \bar{V}_4 + \bar{V}_0 \cdot V_4 \cdot \bar{V}_5) +$$
$$BMV_{311} \cdot V_{11} \cdot \bar{V}_0 \cdot \bar{V}_4$$

The total circuitry of the present invention required to perform the enable function of the reservation station 30 is complex because there are 24 separate, but similar stages. In the interests of clarity, the circuitry of the present invention associated with the first entry of each of the vectors and the $i^{th}$ entry of each of the vectors is illustrated in FIG. 5. Each of the other 24 entries will be the same as those illustrated, therefore, the circuitry for each entry is not illustrated in detail as to not obscure the present invention. FIG. 5 illustrates that the instruction decoder 10 presents instructions and instruction information on the four lines 91 to 94. Instruction 1 is placed over line 91 and enabled by vector 82, instruction 2 over line 92 and enabled by vector 84, instruction 3 over line 93 and enabled by vector 86 and lastly instruction 4 over line 94 and enabled by vector 88.

Entry 0 for each of the enable vectors 82, 84, 86, and 88 are coupled to the enable pins of a set of four pass gates. The bit of entry 0 of enable vector 82 is coupled to the enable pin of pass gate 201(0) via line 210. The bit of entry 0 of enable vector 84 is coupled to the enable pin of pass gate 202(0) via line 211. The bit of entry 0 of enable vector 86 is coupled to the enable pin of pass gate 203(0) via line 212. The bit of entry 0 of enable vector 88 is coupled to the enable pin of pass gate 204(0) via line 213. The data flow pin 91 associated with instruction 1 is communicatively coupled to the instruction decoder 10 (actually, the instruction decoder sends instructions to a Register Alias Table "RAT" first which then forwards the instructions to the reservation station, however the operation of the RAT is not pertinent to the understanding of the present invention) and to the input of pass gate 201(0). Line 92 carries instruction 2 and is coupled to the instruction decoder 10 and to the input of pass gate 202(0). The data flow pin 93 associated with instruction 3 is coupled to the instruction decoder 10 and to the input of pass gate 203(0). Line 94 carries instruction 4 and is coupled to the instruction decoder 10 and to the input of pass gate 204(0). The outputs of each of the pass gates 201(0), 202(0), 203(0), and 204(0) are coupled to entry 0 of the reservation station 30 via the single line 220(0). When an entry within the enable vectors is active, that is, carries a 1, it will active the associated pass gate to couple the input and the output lines together and allow instruction information to flow into the reservation station 30. When disabled, i.e., a 0 is present in a particular entry, the pass gate will not couple the instruction data to the reservation station. It is appreciated that within the present invention the pass gates may be implemented utilizing multiported memory cell arrays.

Only one of the pass gates of these first set of four can be activated at any one time because only one entry 0 of the enable vectors 82, 84, 86, and 88 will be active at any time. Depending on the active pass gate of these four, if any, an instruction (1-4) and its associated data will be routed from the instruction decoder 10 into the 100-200 bit entry of the reservation station 30. It is appreciated that for each of the 24 entries of the enable vectors, the above circuitry and set of four enable pass gates (201($i$)-204($i$)) is present to allow all 24 entries of the reservation station 30 to accept instruction information. Entry 0 of vector 82 routes instruction 1, entry 0 of vector 84 routes instruction 2, entry 0 of vector 86 routes instruction 3 and entry 0 of vector 88 routes instruction 4.

For clarity, the coupling required for the $i^{th}$ entry of the enable vectors and reservation station is illustrated in FIG. 5. It is appreciated that the circuitry for this $i^{th}$ entry is duplicated for all 24 entries of the present invention. Each $i^{th}$ entry of vector 82 is coupled by a line 216 to an enable pin of a pass gate 201($i$) which receives an input from the instruction decoder 10 for instruction 1 (over line 91) and has an output coupled to a line 220($i$) which couples instruction 1 into the $i^{th}$ entry of the reservation station 30. Each entry of enable vector 84 is coupled. Each $i^{th}$ entry of vector 84 is coupled by a line 217 to an enable pin of a pass gate 202($i$) which receives an input from the instruction decoder 10 for instruction 2 (over line 92) and has an output coupled to a line 220($i$) which couples instruction 2 into the $i^{th}$ entry of the reservation station 30. Each $i^{th}$ entry of vector 86 is coupled by a line 218 to an enable pin of a pass gate 203($i$) which receives an input from the instruction decoder 10 for instruction 3 (over line 93) and has an output coupled to a line 220($i$) which couples instruction 3 into the $i^{th}$ entry of the reservation station 30. Lastly, each $i^{th}$ entry of vector 88 is coupled by a line 219 to an enable pin of a pass gate 204($i$) which receives an input from the instruction decoder 10 for instruction 4 (over line 94) and has an output coupled to a line 220($i$) which couples instruction 4 into the $i^{th}$ entry of the reservation station 30.

It is appreciated that since each of the enable vectors 82, 84, 86 and 88 is created simultaneously, they are simultaneously applied to the pass gate network (containing pass gates 201($i$), 202($i$), 203($i$), and 204($i$)). Therefore, the four instructions 1-4 are simultaneously applied from the instruction decoder 10 to the four vacant entries of the reservation station 30 as indicated by the four enable vectors.

An example configuration of the enable vectors is given. Assuming that the highest priority enable vector 82 entry 2 had a one, enable vector 84 entry 6 had a one, enable vector 86 entry 10 had a one and the lowest priority enable vector 88 entry 20 had a one. Entry 2 of vector 82 would enable instruction 1 to be fed into entry 2 of the reservation station via a pass gate 201(2) and line 220(2). Entry 6 of enable vector 84 would feed instruction 2 into entry 6 of the reservation station 30 via a pass gate 202(6). Entry 10 of enable vector 86 will feed instruction 3 into entry 10 of the reservation station 30 via a pass gate 203(10). And lastly, entry 20 of enable vector 88 will feed instruction 4 from the instruction decoder 10 into entry 20 of the reservation station 30 via a pass gate 204(20). The above will happen simultaneously as each of the enable vectors are created at the same time and will be applied to the pass gate network at the same instant in time.

Updating the Deallocation Vector

Once write enable vectors 82, 84, 86, and 88 have been determined by the present invention, the deallocation vector 40 is updated to remove the 1s from the four entries marked by the enable vectors. Each enable vector 82, 84, 86, 88 is analyzed in the present invention in order to determine which entry is set to 1. The corresponding entry in the deallocation vector 40 is then toggled to change from a 1 to a zero. This can rapidly be done by coupling each entry of all four enable vectors to the entries of the deallocation vector 40. Those entries in the enable vectors having a 1 will act to toggle the corresponding entries within the deallocation vector 40.

During the same clock cycle period as the present invention allocation circuit 35 is operating, previously stored instructions within the reservation station 30 are dispatched for execution and thus complete their occupancy of the reservation station and are fed to the execution units 50a-50c. Once a particular instruction is fed to the execution units and removed from the reservation station 30, the entry in which it occupied may become vacant. Therefore, instructions are tracked which have been output from the instruction scheduler 20 and their entries are marked as vacant within the deallocation vector by placing a 1 within the corresponding entry. For any given clock cycle, the general static embodiment of the present invention will be determining which of the highest priority entries within the deallocation vector are vacant, storing instructions into those entries, marking those entry as full, and then marking other previously stored entries as vacant as their associated instructions leave the instruction scheduler.

Processing Flow of the General Static Implementation

In summary, the general static embodiment of the present invention operates to perform the following tasks as illustrated in the flow diagram of FIG. 6. FIG. 6 illustrates the major processing tasks performed by the allocation circuit 35 of the present invention. New instructions are issued by the microprocessor 101 at block 610. Typically there are up to four new instructions issued by the microprocessor via the instruction decoder at block 610. The present invention must find entries within the reservation station 30 for these instructions. The present invention, at block 620, first examines the deallocation vector 40, in the manner described above, to generate twelve 8-bit bitmap vectors based on the number and placement of the 1s located within the deallocation vector. The input to block 620 is the deallocation vector 40 and the output of block 620 are the twelve bitmap vectors 300–311. Block 620 operates within 4 nanoseconds. The 12 twelve bitmap vectors are generated in sequence, set of three is generated simultaneously and four of such sets are generated in rapid sequence. It is appreciated that block 620 of the present invention is accomplished via logical conditions (of Tables 1–4) that are implemented in transistor logic.

Next, at block 630 the dynamic multiplexing of the present invention is done; the present invention examines the twelve bitmap vectors and generates therefrom, using a multiplexing circuit in the manner described above, four 24-bit enable vectors 82, 84, 86, and 88. Each of the enable vectors will have only one bit set of the 24 entries. Block 630 operates within 1.1 nanoseconds. The input of block 630 of the present invention are the twelve 8-bit bitmap vectors and the output of block 630 are the four 24-bit enable vectors. The four enable vectors are generated by the present invention simultaneously according to the multiplexing conditions. It is appreciated that block 630 of the present invention is accomplished via logical conditions (of Table 5) that are implemented in transistor logic.

Referring to FIG. 6, at block 640, the present invention applies the four 24 bit vectors to a pass gate network that routes the four instructions into four vacancies of the reservation station as indicated by the four enable vectors. Each enable vector is responsible for directing a particular instruction to an entry within the reservation station. The input to block 640 are the four enable vectors and the output of this block is the passage of the instructions into the reservation station. At block 650 the deallocation vector is updated by toggling to zero those entries that are used by the enable vectors to hold the new instruction data. At the same time, the reservation station marks as vacant those entries that correspond to instructions that have been sent to the execution units from the instruction scheduler. The processing of the flows from block 610 to block 650 occurs within one clock cycle. At the start of the next clock cycle the present invention returns to block 610 to start the cycle once more for a new set of instructions and an updated deallocation vector.

It is appreciated that the circuits of the general static embodiment are realized using BiCMOS technology.

VI. GENERAL DYNAMIC EMBODIMENT

The present invention is also implemented via a substantially dynamic general embodiment. This embodiment is called dynamic in so far as this embodiment utilizes dynamic CMOS circuit design techniques. Within this embodiment, there are four distinct stages of the invention that operate in series fashion. This process of the present invention takes the deallocation vector 40 and generates 4 enable vectors, one for each instruction. Each of these enable vectors is 24 bits wide and can have only one entry set for a "1." The "1" directly activates the write enable of the reservation station entry which allows all information pertaining to that instruction to be written into the reservation station. This portion of the dynamic implementation is identical to the static implementation.

FIG. 7 illustrates the overall process flow of the general dynamic embodiment of the present invention. It is appreciated that FIG. 7 specifically identifies the input and output labels used in the detailed circuit of FIG. 8A and FIG. 8B. A sample deallocation vector 40 is given illustrating four "1s" within the vector. The 24 entries of the deallocation vector 40 are labeled a0 to a23. According to the flow of FIG. 7, the present invention at the first stage, scans the deallocation vector 40 for a first priority "1." Priority is determined based on the entry number of the vector, where 0 is the highest and 23 the lowest, however, any priority scheme could be adopted within the scope of the present invention (i.e., where entry 23 is the highest priority and 0 the lowest, or where 0–11 are taken and then 12–23, etc.). Upon locating the first priority one, the present invention at the first stage outputs enable vector 150 having a 1 set corresponding to the entry number of the highest priority 1 of the deallocation vector 40 and zeros elsewhere for the other 23 entries. This is the "b" output vector. The enable vector 150 corresponds to the 24 outputs b0 to b23 of the circuits of FIG. 8A and FIG. 8B. Also, at the first stage, avail__1 outputs are generated which are found in vector 710 of FIG. 7. Entries of the avail__1 vector are called a1avail1 (note a0avail1 would not be generated because this bit would not be sent to the ) to a23avail1.

These outputs indicate the entries of the deallocation vector that are available to the subsequent stages of the present invention searching process; an entry is available (whether or not it is a "1" or a "0") if it has not yet been selected by an enable vector. In other words, the available vectors (710, 720, 730) indicate those entries that were not yet selected by a higher priority enable vector (150, 151, 152, 153). For instance, the avail__1 vector 710 indicates that all the entries of the deallocation vector are available ("1") to the second stage processing except 1) the entry (a3) that corresponds to the highest priority "1" found and 2) the first entry (a0) of the deallocation vector 40 can never be available for the second stage because the first stage would have taken it.

It is appreciated that there is not a signal a0avail1 generated because this bit a0 is never available for the second stage processing for output1 enables. It a0 is set, it would be taken by the first stage. The signal a1avail1 indicates that bit 1 was not set in the first stage enable vector. This could mean that bit0 was set (a0=1) or that the a1 bit was a zero.

At the second stage processing the present invention general dynamic embodiment searches for the next highest priority "1" of the deallocation vector and generates enable vector 151 based on this entry. At the second stage, the avail__2 vector 720 is generated that indicates the entries of the original deallocation vector that are available to the third processing stage. Entries 0 and 1 of the avail__2 vector 720 are not available to the third state since the first or the second stage would have taken them. Entries of the avail__2 vector are called a0avail2 to a23avail2. Also, the first two highest priority "1s" found in the first and second stage will not be available to the third processing and they are marked as not available in the 720 vector. The second stage outputs vector 151 as the second enable vectors. Entries c0 to c23 make up the 24 entries of this enable vector and correspond to the outputs of FIG. 8A and FIG. 8B.

At the third stage of processing of the present invention, the third enable vector 152 is generated and holds the third priority "1" located within the deallocation vector 40. Enable vector 152 is composed of 24 entries labeled d0 to d23. An avail_3 vector 730 indicates which entries of the deallocation 40 are available for the fourth and last processing stage of the present invention. Entries of the avail_3 vector are called a0avail3 to a23avail3. The avail_3 vector will indicate that the first three priority "1s" are not available and also that the first three entries are not available to the enable vector 153 (generated by the fourth stage). Lastly, the enable vector 153 is generated by the fourth stage of the present invention wherein the deallocation vector is scanned to locate the fourth priority "1" of the 24 entries. The enable vector 153 is composed of 24 entries e0 to e23. There are no subsequent scanning stages of the general dynamic embodiment of the present invention past the fourth stage so no available vector is generated as a result of the fourth stage.

Therefore according to FIG. 7, the present invention general dynamic embodiment contains four stages that are operated in sequence. The first stage generates the first enable vector 150 and an avail_1 710 vector which is used by the second stage to indicate those entries of the deallocation vector 40 still available. The second stage generates enable vector 151 and also an avail_2 vector 720 to indicate to the third stage which enables of the deallocation vector 40 are yet available for selection. The third stage generates enable vector 152 and a last available vector avail_3 730 which indicates to the last stage which entries of the deallocation vector 40 have not been selected and are therefore available. The last processing stage then generates the last enable vector 153. As the static embodiment, the enable vectors of the dynamic embodiment are coupled as shown in FIG. 5 with regard to the enable vectors 82, 84, 86, and 88 respectively, to control information access into the reservation station 30 for the current four instructions. Enable vector 150 is coupled as vector 82, vector 151 is coupled as vector 84, vector 152 is coupled as vector 86 and vector 153 is coupled as vector 88.

Figure 8A:
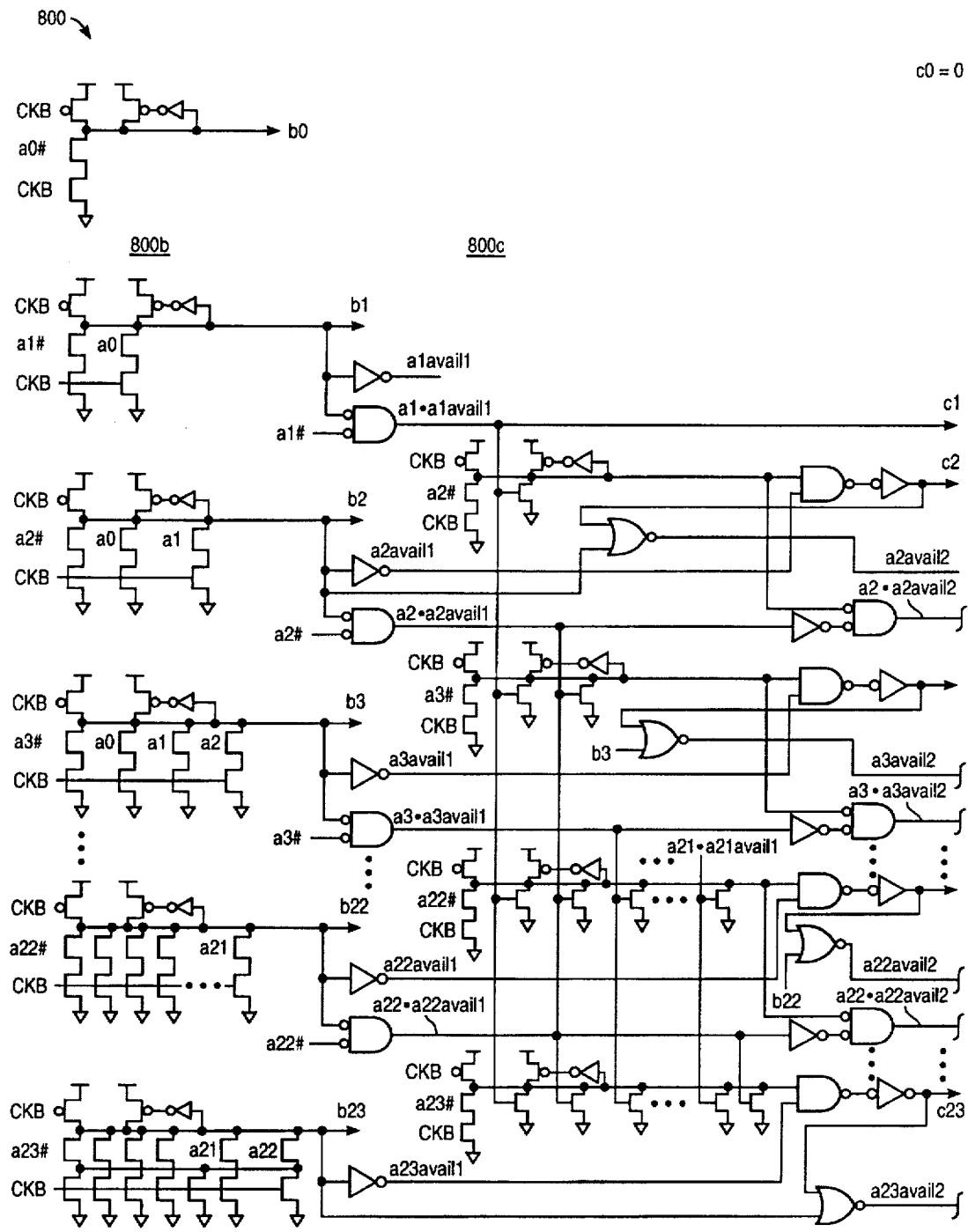
FIG. 8A and FIG. 8B illustrate the circuitry implemented by the present invention to realize the dynamic embodiment of the present invention.
Figure 8B:
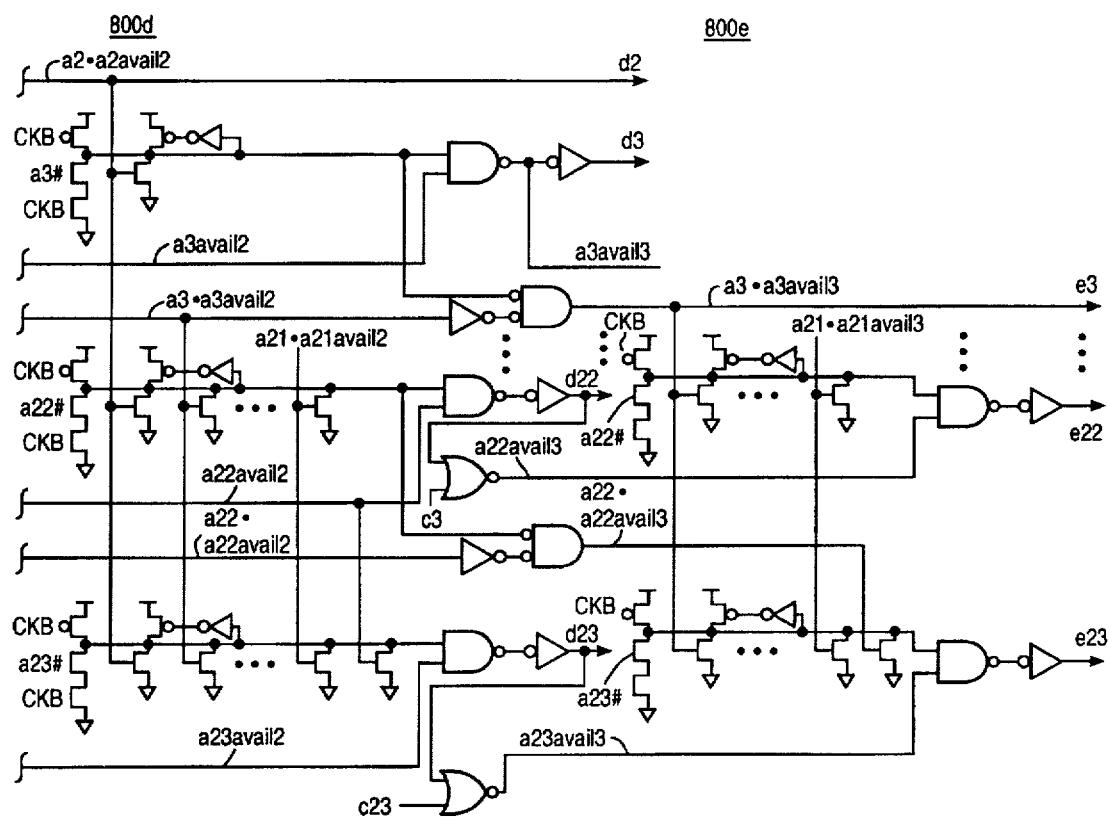

The specific and detailed implementation of the circuitry 800 of the general dynamic embodiment of the present invention is illustrated in FIG. 8A and FIG. 8B. The logic utilized by the dynamic embodiment as shown in Bi-CMOS technology. The entire circuitry of the dynamic embodiment is very complex and functionally redundant in many places. FIGS. 8A and 8B illustrate the major circuit and logic stages of the this embodiment in a form that can be understood and replicated in the areas illustrated in order to generate the repeating circuitry. The reduced circuit logic of FIGS. 8A and 8B is presented for clarity. It is appreciated that given the circuitry plan of FIGS. 8A and 8B and the related discussions, the entire circuit of the dynamic embodiment of the present invention can easily be realized. The first stage of the dynamic implementation is 800b, the second stage is 800c, the third stage is 800d, and the final stage of the dynamic embodiment is 800e. The circuit notation "#" refers to the inverse of the signal indicated and "ckB" indicates the clock pulse used to generate the functions of the dynamic embodiment of the present invention (which is the same as the ck# designation).

Referring to FIG. 8A, stage 800b inputs the 24 entries (and inverses) of the deallocation vector labeled a0 to a23 and the clock pulse. Stage 800b, as shown, outputs the first enable vector 150 as outputs b0 to b23. Stage 800b also outputs the first avail_1 vector 720 as outputs a0avail1–a23avail1. The second stage 800c inputs the avail_1 vector 720 and the clock to output the second enable vector 151 composed of outputs b0 to b23. The second stage 800c outputs the second available vector a2avail2 to a23avail2. These outputs are then coupled to the inputs of the third stage 800d shown in FIG. 8B as well as the clock. The third stage 800d outputs the entries d0 to d23 of the third enable vector 152 as well as the third available vector 730 composed of entries a3avail3–a23avail3 to the last stage. The four and last stage 800e inputs the third available vector 730 and the clock and generates therefrom the last enable vector 153 composed of entries e0 to e23. Due to the coupling of the stages, the dynamic embodiments operates in sequence with the first, second, third and last stage operating respectively to generate the enable vectors 150, 151, 152 and 153 in sequence.

After the four enable vectors 150–153 are generated, the general dynamic embodiment then enables the corresponding entries of the reservation station and updates the deallocation vector 40 to reflect that the selected entries of the enable vectors are allocated. It is appreciated that sections of the general static embodiment of the present invention are analogous to the general dynamic embodiment of the present invention unless specifically differentiated herein.

It is appreciated that the logic utilized within the general dynamic embodiment of the present invention illustrated in FIG. 8A and FIG. 8B is listed below in the Logic Section. According to this listing the values B[0] to B[23] represent the stage0 output vector of FIG. 7. Values C[0] to C[23] represent the stage1 output vector of FIG. 7. Values D[0] to D[23] represent the stage2 output vector of FIG. 7. And, values E[0] to E[23] represent the last stage, or stage3, output vector of FIG. 7. The logic implemented by the Logic Section is one illustration of the present invention and the present invention should not be construed as limited by this particular embodiment as several variations of the particular logic utilized within an embodiment of the present invention would remain within the spirit and scope of the present invention.

LOGIC SECTION
FOR GENERAL DYNAMIC EMBODIMENT

| | | |
|---|---|---|
| B[0] | := | A[0]; |
| B[1] | := | (NOT A[0]) AND A[1]; |
| | | a1avail1 := NOT B[1]; |
| | | a1.a1avail1 := A[1] AND a1avail1; |
| B[2] | := | (NOT a[0]) AND (NOT A[1]) AND A[2]; |
| | | a2avail1 := NOT B[2]; |
| | | a2.a2avail1 := A[2] AND a2avail1; |

LOGIC SECTION
FOR GENERAL DYNAMIC EMBODIMENT

| | | |
|---|---|---|
| B[3] | := | (NOT A[0]) AND (NOT A[1]) AND (NOT A[2]) AND A[3]; |
| | | a3.avail1 := NOT B[3]; |
| | | a3.a3avail1 := A[3] AND a3avail1; |
| B[4] | := | (NOT A[0]) AND (NOT A[1]) AND (NOT A[2]) AND (NOT A[3]) AND A[4]; |
| | | a4.avail1 := NOT B[4]; |
| | | a4.a4avail1 := A[4] AND a4avail1; |
| B[5] | := | (NOT A[0]) AND (NOT A[1]) AND (NOT A[2]) AND (NOT A[3]) AND (NOT A[4]) AND A[5]; |
| | | a5avail1 := NOT B[5]; |
| | | a5.avail1 := A[5] AND a5avail1; |
| B[6] | := | (NOT A[0]) AND (NOT A[1]) AND (NOT A[2]) AND (NOT A[3]) AND (NOT A[4]) AND (NOT A[5]) AND A[6]; |
| | | a6avail1 := NOT B[6]; |
| | | a6.a6.avail1 := A[6] AND a6avail1; |
| B[7] | := | (NOT A[0]) AND (NOT A[1]) AND (NOT A[2]) AND (NOT A[3]) AND (NOT A[4]) AND (NOT A[5]) AND (NOT A[6]) AND A[7]; |
| | | a7avail1 := NOT B[7]; |
| | | a7.a7.avail1 := A[7] AND a7avail1; |
| B[8] | := | (NOT A[0]) AND (NOT A[1]) AND (NOT A[2]) AND (NOT A[3]) AND (NOT A[4]) AND (NOT A[5]) AND (NOT A[6]) AND (NOT A[7]) AND A[8]; |
| | | a8avail1 := NOT B[8]; |
| | | a8.a8.avail1 := A[8] AND a8avail1; |
| B[9] | := | (NOT A[0]) AND (NOT A[1]) AND (NOT A[2]) AND (NOT A[3]) AND (NOT A[4]) AND (NOT A[5]) AND (NOT A[6]) AND (NOT A[7]) AND (NOT A[8]) AND A[9]; |
| | | a9avail1 := NOT B[9]; |
| | | a9.a9.avail1 := A[9] AND a9avail1; |
| B[10] | := | (NOT A[0]) AND (NOT A[1]) AND (NOT A[2]) AND (NOT A[3]) AND (NOT A[4]) AND (NOT A[5]) AND (NOT A[6]) AND (NOT A[7]) AND (NOT A[8]) AND (NOT[9]) AND A[10]; |
| | | a10avail1 := NOT B[10]; |
| | | a10.a10.avail1 := A[10] AND a10avail1; |
| B[11] | := | (NOT A[0]) AND (NOT A[1]) AND (NOT A[2]) AND (NOT A[3]) AND (NOT A[4]) AND (NOT A[5]) AND (NOT A[6]) AND (NOT A[7]) AND (NOT A[8]) AND (NOT [9]) AND (NOT A[10]) AND A[11]; |
| | | a11avail1 := NOT B[11]; |
| | | a11.avail1 := A[11] AND a11avail1; |
| C[0] | := | 0; |
| C[1] | := | a1.a1avail1; |
| C[2] | := | (NOT a1.a1avail1;) AND a2avail1 AND A[2]; |
| | | a2avail2 := 0; |
| | | a2.a2avail2 := (a1.a1avail1) OR A[2]) AND a2.a2avail1; |
| C[3] | := | (NOT a1.a1avail1) AND (NOT a2.a2avail1) AND a3avail1 AND A[3]; |
| | | a3avail2 := B[3] NOR C[3]; |
| | | a3.a3avail2 := (a1.a1avail1 OR a2.a2avail1 OR NOT A[3]) AND a3.a3avail1; |
| C[4] | := | (NOT a1.a1avail1) AND (NOT a2.a2avail1) AND (NOT a3.a3avail1) AND a4avail1 AND A[4]; |
| | | a4avail2 := B(4) NOR C[4]; |
| | | a4.a4avail2 := (a1.a1avail1 OR a2.a2avail OR a3.avail1 OR NOT A[4]) AND a4.a4avail1; |
| C[5] | := | (NOT a1.a1avail1) AND (NOT a2.a2avail1) AND (NOT a3.avail1) AND (NOT a4.a4avail1) AND a5avail1 AND A[5]; |
| | | a5avail2 := B[5] NOR C[5]; |
| | | a5.a4avail2 := (a1.a1avail1 OR a2.a2avail1 OR a3.a3avail1 OR a4.a4avail1 OR NOT A[5]) AND a5.a5avail1; |
| C[6] | := | (NOT a1.a1avail1) AND (NOT a2.a2avail1) AND (NOT a3.a3avail) AND (NOT a4.a4avail1) AND (NOT a5.a5avail1) AND a6avail1 AND A[6]; |
| | | a6avail2 := B[6] NOR C[6]; |
| | | a6.a6avail2 := (a1.a1avail1 OR a2.a2avail1 OR a3.a3avail1 OR a4.a4avail 1 OR a5.a5avail1 OR NOT A[5] AND a6.a6avail; |
| C[7] | := | (NOT a1.a1avail1) AND (NOT a2.a2avail1) AND (NOT 3.a3avail1) AND (NOT a4.a4avail1) AND (NOT a5.a5avail1) AND (NOT a6.a6avail1) AND a7avail1 AND A[7]; |
| | | a7avail2 := B[7] NOR C[7]; |
| | | a7.a7avail2 := (a1.a1avail1 OR a2.a2avail1 OR a3.a3avail1 OR a4.a4avail1 OR a5.a5avail1 OR a6.a6avail1 OR NOT A[5] AND a7.a7avail1; |
| C[8] | := | (NOT a1.a1avail1) AND (NOT a2.a2avail1) AND (NOT a3.a3avail1) AND (NOT a4.a4avail1) AND (NOT a5.a5avail1) AND (NOT a6.a6avail1) AND (NOT a7.a7avail1) AND a8avail1 AND A[8]; |
| | | a8avail2 := B[8] NOR C[8]; |
| | | a8.a8avail2 := (a1.a1avail1 OR a2.a2avail1 OR a3.a3avail1 OR a4.a4avail1 OR a5.a5avail1 OR a6.a6avail1 OR a7.a7avail1 OR NOT A[5]) AND a8.a8avail1; |
| C[9] | := | (NOT a1.a1avail1) AND (NOT a2.a2avail1) AND (NOT a3.a3avail1) AND (NOT a4.a4avail1) AND (NOT a5.a5avail1) AND (NOT a6.a6avail1) AND (NOT a7.a7avail1) AND (NOT a8.a8avail1) AND a9avail1 AND A[9]; |
| | | a9avail2 := B[9] NOR C[9]; |
| | | a9.a9avail2 := (a1.a1avail1 OR a2.a2avail1 OR a3.a3avail1 OR a4.a4avail1 |

LOGIC SECTION
FOR GENERAL DYNAMIC EMBODIMENT

|  |  |  |
|---|---|---|
|  |  | OR a5.a5avail1 OR a6.a6avail1 OR a7.a7avail1 OR a8.a8avail1 NOT A[5])<br>AND a9.a9avail1; |
| C[10] | := | (NOT a1.a1avail1) AND (NOT a2.a2avail1) AND<br>(NOT a3.a3avail1) AND (NOT a4.a4avail1) AND<br>(NOT a5.a5avail1) AND (NOT a6.a6avail1) AND<br>(NOT a7.a7avail1) AND (NOT a8.a8avail1) AND<br>(NOT a9.a9avail1) and a10avail1 AND A[10];<br>a10avail2 := B[10] NOR C[10];<br>a10.a10avail2 := (a1.a1avail1 OR a2.a2avail1 OR a3.a3avail1 OR a4.a4avail1<br>OR a5.a5avail1 OR a6.a6avail1 OR a7.a7avail1 OR a8.a8avail1 OR<br>a9.a9avail1 OR NOT A[5]) AND a10.a10avail1; |
| C[11] | := | (NOT a1.a1avail1) AND (NOT a2.a2avail1) AND (NOT a3.a3avail1) AND<br>(NOT a4.a4avail1) AND (NOT a5.a5avail1) AND (NOT a6.a6avail1) AND<br>(NOT a7.a7avail1) AND (NOT a8.a8avail1) AND (NOT a9.a9avail1) AND<br>(NOT a10.a10avail1) AND A[11];<br>a11avail2 := B[11] NOR C[11];<br>a11.a11avail2 := (a1.a1avail1 OR a2.a2avail1 OR a3.a3avail1 OR a4.a4avail1<br>OR a5.a5avail1 OR a6.a6avail1 OR a7.a7avail1 OR a8.a8avail1 OR<br>a9.a9avail1 OR a10.a10avail1 OR NOT A[5]) AND a10.a10avail1; |
| . |  |  |
| . |  |  |
| C[23] | := | (NOT a1.a1avail1) AND (NOT a2.a2avail1) AND<br>(NOT a3.a3avail1) AND<br>.......... (NOT a22.a22avail1) AND a23avail AND A[23];<br>a23avail2 := B[23] NOR C[23]; |
| D[0] | := | 0; |
| D[1] | := | 0; |
| D[2] | := | a2.a2avail2; |
| D[3] | := | (NOT a2.a2avail2) AND A[3] AND a3avail2;<br>a3avail3 := NOT D[3];<br>a3.a3avail3 := (a2.a2avail2 OR NOT A[3]) AND a3.a3avail2; |
| D[4] | := | (NOT a2.a2avail2) AND (not a3.a3avail2) AND A[4] AND a4avail2;<br>a4avail3 := NOT (B[4] OR C[4] OR D[4]);<br>a4.a4avail3 := (a2.a2avail2 OR a3.a3avail2 NOT A[3]) AND<br>a4.a4avail2; |
| D[5] | := | (NOT a2..a2avail2) AND (not a3.a3avail2) AND (NOT a4.a4avail2) AND A[5]<br>AND a5avail2;<br>a5avail3 := NOT (B[5] OR C[5] OR D[5]);<br>a5.a5avail3 := (a2.a2avail2 OR a3.a3avail2 OR a4.a4avail2 NOT A[3]) AND<br>a5.a5avail2; |
| D[6] | := | (NOT a2.a2avail2) AND (NOT a3.a3avail2) AND (NOT a4.a4avail2) AND NOT<br>a5.a5avail2) AND A[6] and a6avail2;<br>a6avail3 := NOT (B[6] OR C[6] OR D[6]);<br>a6.a6avail3 := (a2.a2avail2 OR a3.a3avail2 OR a4.a4avail2 OR a5.a5avail2<br>OR NOT A[3]) AND a6.a6avail2; |
| D[7] | := | (NOT a2.a2avail2) AND (NOT a3.a3avail2) AND (NOT a4.a4avail2) AND<br>(NOT a5.a5avail2) AND (NOT a6.a6avail2) AND A[7] and A7avail2;<br>a7avail3 := NOT (B[7] OR C[7] OR D[7]);<br>a7.a7avail3 := (a2.a2avail2 OR a3.a3avail2 OR a4.a4avail2 OR a5.a5avail2<br>OR a6.a6avail2 OR NOT A[3] AND a7.a7avail2; |
| D[8] | := | (NOT a2.a2avail2) AND (NOT a3.a3avail2) AND (NOT a4.a4avail2) AND<br>(NOT a5.a5avail2) AND (NOT a6.a6avail2) AND (NOT a7.a7avail2) AND A[8]<br>AND A8avail2;<br>a8avail3 := NOT (B[8] or C[8] OR D[8]);<br>a8.a8avail3 := (a2.a2avail2 OR a3.a3avail2 OR a4.a4avail2 OR a5.a5avail2<br>OR a6.a6avail2 OR a7.a7avail2 OR NOT A[3]) AND a8.a8avail2; |
| D[9] | := | (NOT a2.a2avail2) AND (NOT a3.a3avail2) AND (NOT a4.a4avail2) AND<br>(NOT a5.a5avail2) AND (NOT a6.a6avail2) AND (NOT a7.a7avail2) AND<br>(NOT a8.a8avail2) AND A[9] and A9avail2;<br>a9avail3 := NOT (B[9] OR C[9] OR D[9]);<br>a9.a9avail3 := (a2.a2avail2 OR a3.a3avail2 OR a4.a4avail2 OR a5.a5avail2<br>OR a6.a6avail2 OR a7.a7avail2 OR a8.a8avail2 OR NOT A[3]) AND<br>a9.a9avail2; |
| D[10] | := | (NOT a2.a2avail2) AND (NOT a3.a3avail2) AND (NOT a4.a4avail2) AND<br>(NOT a5.a5avail2) AND (NOT a6.a6avail2) AND (NOT a7.a7avail2) AND<br>(NOT a8.a8avail2) AND (NOT a9.a9avail2) AND A[10] AND A10avail2;<br>a10avail3 := NOT (B[10] OR C[10] OR D[10]);<br>a10.a10avail3 := (a2.a2avail2 OR a3.a3avail2 OR a4.a4avail2 OR<br>a5.a5avail2 OR a6.a6avail2 OR a7.a7avail2 OR a8.a8avail2 OR a9.a9avail2<br>OR NOT A[3]) AND a10.a10avail2; |
| D[11] | := | (NOT a2.a2avail2) AND (NOT a3.a3avail2) AND (NOT a4.a4avail2) AND<br>(NOT a5.a5avail2) AND (NOT a6.a6avail2) AND (NOT a7.a7avail2) AND<br>(NOT a8.a8avail2) AND (NOT a9.a9avail2) AND (NOT a10.10avail2) AND<br>A[11] AND A11avail2;<br>a11avail3 := NOT (B[11] OR C[11] OR D[11]);<br>a11.a11avail3 := (a2.a2avail2 OR a3.a3avail2 OR a4.a4avail2 OR |

LOGIC SECTION
FOR GENERAL DYNAMIC EMBODIMENT a5.a5avail2 OR a6.a6avail2 OR a7.a7avail2 OR a8.a8avail2 OR a9.a9avail2
OR a10.10avail2 OR NOT A[3]) AND a11.a11avail2;

.
.
.

| | | |
|---|---|---|
| D[23] | := | (NOT a2.a2avail2) AND (NOT a3.a3avail2) AND |
| | | ......... (NOT a.22.a22avail2) AND A[23] AND a23avail2; |
| | | a23avail3 := NOT (B[23] OR C[23] OR D[23]); |
| E[0] | := | 0 |
| E[1] | := | 0 |
| E[2] | := | 0 |
| E[3] | := | a3.a3avail3 |
| E[4] | := | (NOT a3.a3avail3) AND A[4] AND a4avail3 |
| E[5] | := | (NOT a3.a3avail3) AND (NOT a4.a4avail3) AND A[5] AND a5avail3; |
| E[6] | := | (NOT a3.a3avail3) AND (NOT a4.a4avail3) AND (NOT a5.a5avail3) AND A[6] AND a6avail3 |
| E[7] | := | (NOT a3.a3avail3) AND (NOT a4.a4avail3) AND (NOT a5.a5avail3) AND (NOT a6.a6avail3) AND A[7] AND a7avail3; |
| E[8] | := | (NOT a3.a3avail3) AND (NOT a4.a4avail3) AND (NOT a5.a5avail3) AND (NOT a6.a6avail3) AND (NOT a7.a7avail3) AND A[8] AND a8avail3; |
| E[9] AND | := | (NOT a3.a3avail3) AND (NOT a4.a4avail3) AND (NOT a5.a5avail3) AND (NOT a6.a6avail3) AND (NOT a7.a7avail3) AND (NOT a8.a8avail3) AND A[9] 9avail3; |
| E[10] | := | (NOT a3.a3avail3) AND (NOT a4.a4avail3) AND (NOT a5.a5avail3) AND (NOT a6.a6avail3) AND (NOT a7.a7avail3) AND (NOT a8.a8avail3) AND (NOT a9.a9avail3) AND A[10] AND a10avail3; |
| E[11] | := | NOT a3.a3avail3) AND (NOT a4.a4avail3) AND (NOT a5.a5avail3) AND (NOT a6.a6avail3) AND (NOT a7.a7avail3) AND (NOT a8.a8avail3) AND (NOT a9.a9avail3) AND (NOT a10.10avail3) AND A[11] AND a11avail3; |

.
.
.

| | | |
|---|---|---|
| E[23] | := | (NOT a3.a3avail2) AND (NOT a4.a4avail3) AND |
| | | ......... (NOT a22.a22avail3) AND A[23] AND a23avail3; |
| WrRSEntry | | := B OR C OR D OR E |
| MaskRSEntry | | := NOT WrRSEntry; |
| A: = | | Dealloc Vec AND ALMaskRSEntry; |

VII. TWO CYCLE ALLOCATION PIPELINE

The two cycle pipeline embodiment of the present invention allocation circuitry is now described. According to this embodiment, as discussed above, the determination of which entries of the reservation station are vacant, by interrogation of the deallocation vector information (along with other information), and the allocation of those entries to a set or group of uops spans two clock cycles (e.g., two pipestages). Namely, during the first clock cycle, n, a modified deallocation vector 40 is interrogated for vacancies and a list of vacant entries is discovered. During the second clock cycle, n+1, a set of uops is received and allocated to the reservation station according to the list of entries discovered in clock cycle n. Of course, since the entire process of the present invention is pipelined, also at cycle n+1, another modified deallocation vector is interrogated in order to determine a list of vacancies for allocation to uops that are received at cycle n+2.

Since the allocation circuitry of this embodiment requires two cycle to complete, there is an inherent information latency between the entries indicated as vacant by the deallocation vector 40 sent by the reservation station for a current clock cycle (n+1) and the entries that were located and reserved in the previous clock cycle (n). To account for this latency, the present invention utilizes a modified deallocation vector in order to perform the allocation process by circuit 35. This modified deallocation vector, in effect, comprises the deallocation vector 40 supplied from the reservation station (preliminary deallocation vector) with certain entries masked as not available (these are the entries that were discovered as available for allocation in the just previous cycle but have not yet received instruction information).

Due in part to the circumstance that vacancies are discovered in one clock cycle but not allocated to the instructions until the next clock cycle, the present invention also includes the generation and use of certain speculative stall information signals in case the allocation circuitry of a previous clock cycle (n) fails to discover (as available for allocation) enough entries for a set of instructions that are received in a subsequent clock cycle (n+1). Further, since not all instructions require allocation to the reservation station (e.g., invalid instructions and floating point exchange operations, FXCHs), the present invention also provides circuitry for filtering these instructions out of the circuitry (1) that assigns reservation station entries to instructions and also for (2) the circuitry that masks the preliminary deallocation vector 40 of a current cycle (n+1) with entries discovered as available for allocation from the prior cycle (n).

It is appreciated that unless specifically stated otherwise hereinafter, circuitry described with reference to the general embodiments may be implemented within the scope of the two cycle pipeline embodiment of the present invention. For instance, the allocation circuitry 35 and the write enable logic (as shown in FIG. 5) as described above may be utilized within the two cycle pipeline embodiment of the present invention. As used with reference to the two cycle embodiment of the present invention, searching or discovering vacancies available for allocation refers to the selecting of a certain number (h) of vacant entries for allocating instructions to a resource buffer. The instruction information is not actually written into the resource buffer (e.g., allocated) until processed by write enable logic. Circuit 35, as discussed with reference to the two cycle embodiment includes the allocation circuitry, but not the write enable circuitry. As will be shown with reference to FIG. 10, the write enable circuitry is separate from the allocation block 35 according to the two cycle embodiment of the present invention. Further, for an alternate embodiment, the write enable circuitry may also be incorporated within the circuitry of the reservation station.

With reference to FIG. 9, illustrating a system clock signal 910 for n−1, n, and n+1 cycles. Also shown are processing tasks executed by the circuitry of the two cycle pipeline embodiment of the present invention for exemplary cycles n and n+1. The high and low phases of the cycles are illustrated with dashed lines. During the high phase of cycle n, the present invention receives the preliminary deallocation vector 40 from the reservation station 30. This is called the preliminary deallocation vector 40 for purposes of the two cycle embodiment of the present invention. Also during the high phase of cycle n, the present invention receives a set of signals indicating which entries of the reservation station were discovered available for allocation during the previous cycle n−1. Also during the high phase of cycle n (but not shown), the present invention receives a set or group of instructions or operations for allocation. Other functions are also performed during the high phase of cycle n, but they are analogous to the functions performed during the high phase of cycle n+1 since the system is pipelined—these functions will be described with reference to cycle n+1.

During cycle n, the present invention utilizes (1) the information contained in the preliminary deallocation vector 40, (2) information regarding the set of instructions received during cycle n, and (3) information regarding the allocation search process of cycle n−1, to determine which entries of the reservation station are available for allocation for the instructions of cycle n+1. Further, the present invention also generates potential or speculative stall information to provide to the processing of cycle n+1 in the event not enough entries were allocated during cycle n. Also during cycle n (but not shown) the present invention asserts the write enable lines to store instruction information received during cycle n (e.g., allocates) to the entries discovered for allocation during cycle n−1.

During the high phase of cycle n+1 of FIG. 9, a set of new instructions ("uops") are received for processing. These uops are checked to determine if they require a reservation station entry. The circuitry also receives the speculative stall information generated by cycle n. The entries discovered available for allocation during cycle n are also received during the high phase of cycle n+1. If a uop needing a reservation station entry is provided but has no corresponding allocation entry from cycle n, then not enough entries were provided in cycle n and a stall is generated by the present invention until sufficient reservation station entries become vacant (e.g., due to dispatch). This is the stall logic determination (which also occurs during the high phase of cycle n). The mask logic processing of the high phase of cycle n+1 determines which of the received entries from cycle n actually will be used by the uops of cycle n+1; some of the uops of cycle n+1 may not require a reservation station entry, or perhaps only one or two or three uops were received during cycle n+1 while the allocation circuitry of cycle n provided for four entries. Therefore, at cycle n it is not known if a stall is required, so the bits produced are "speculative."

In any event, those entries that were discovered available for allocation during cycle n and actually required by the uops of cycle n+1 will be deasserted by a masking or zero process of the preliminary deallocation vector 40. These entries will be marked as unavailable for the processing of circuit 35 of cycle n+1 for FIG. 10. This is the "modified" deallocation vector used by the two cycle pipeline of the present invention. This modified deallocation vector will then be fed to circuitry 35 to determine the appropriate allocation vectors during the low phase of cycle n+1. As also shown, during cycle n+1 write enables are asserted, based on the entries discovered as available for allocation during the process perforated during cycle n, in order to store the instruction information associated with the uops received during cycle n+1 to the reservation station 30.

FIG. 10 illustrates the logical block diagram of the circuitry of the present invention utilized to perform the above functions. The circuitry will be described with focus on the input and outputs of cycle n. However, it is understood that since the present invention is pipelined, the circuitry and functionality described with reference to cycle n can be and is extended for all cycles. During cycle n−1, the present invention circuitry 35 interrogates a modified deallocation vector of cycle n−1 to determine a set or entries of the reservation station 30 that are available for allocation to a maximum number of expected uops (h) to arrive during cycle n. This maximum number (h) may vary by implementation but under exemplary implementations as described herein (h) may be four or three. Assuming that the instruction issuing units (520 and 521 of FIG. 1B) of the processor issue up to three instructions per cycle, then circuitry 35 will locate up to three entries within the modified deallocation vector of cycle n−1. The circuitry of block 35 and its operation for the both static and dynamic implementations is described above and either may be utilized within the two cycle pipeline implementation of the present invention. The entries that were discovered as available for allocation by circuit 35 during cycle n−1 are supplied to cycle n via bus 1130 as shown so that they might be used for the uops of cycle n.

Circuit 35 is an allocation circuit in so far as it discovers entries that are available for allocation to the reservation station. However, under the context of the present invention it is appreciated that the actual entries are not "allocated" to the reservation station until actually written into the buffer. This is the case because some of the vacancies discovered by circuit 35 may not be utilized because the uops received that are to utilize the discovered entries do not require the entry (e.g., the uop is invalid or an FXCH). Therefore, although circuit 35 may be called an allocation circuit or may be referred to as performing an allocation, the circuit discovers entries that are available for allocation.

Also during cycle n−1 of FIG. 10, block 1020 generates speculative stall bit information. Assuming an embodiment wherein h=3, for each entry that is not found by circuit 35, block 1020 generates a bit signal for that position. For instance, if only two entries were located by circuit 35 during cycle n−1, the third entry would contain an asserted speculative stall bit. If one entry was located by circuit 35 during cycle n−1 then the second and third entry as generated by block 1020 would contain asserted speculative stall bits. Lastly, if no entries were located by circuit 35 during cycle n−1 then all three entries would contain an asserted speculative stall bit generated by block 1020. The outputs of the speculative stall signals over line 1220 are illustrated below in four possible cases, assuming h=3. It is appreciated that if h=4, the possible outputs of block 1020 would be five with four speculative stall bit signal configurations.

|  | Circuit 35 Locates 3 Vacant Entries | Circuit 35 Locates 2 Vacant Entries | Circuit 35 Locates 1 Vacant Entry | Circuit 35 Locates 0 Vacant Entries |
|---|---|---|---|---|
| Signal Over 1220 | | | | |
| (1220a) | 0 | 0 | 0 | 1 |
| (1220b) | 0 | 0 | 1 | 1 |
| (1220c) | 0 | 1 | 1 | 1 |

These outputs are called speculative stall bits because cycle n–1 does not know anything about the uops for which it is allocating entries. In other words, the uops that will use these entries allocated by circuit 35 are received during cycle n. For instance, if cycle n–1 only finds two entries, but only two of the three uops of cycle n actually need reservation station entries, then no stall is required. However, if all three uops of cycle n need reservation station entries, then two will not be enough and a stall is required. But cycle n–1 does not know which uops of cycle n will need reservation station entries, if any, so the outputs of block 1020 are merely speculative stall bits or signals.

With reference to FIG. 10, the circuitry and processing of cycle n is now discussed. The circuitry of cycle n inputs (1) the entries discovered available for allocation during the process of cycle n–1 from circuit 35 over bus 1130, (2) the speculative stall bits of block 1020 of cycle n–1 over bus 1220, (3) a preliminary deallocation vector 40 from the reservation station, and (4) and a set of uops (with a maximum of h) from the instruction issue units (520 and 521) that are received at 1090. The preliminary deallocation vector 40 is based on information that has been written into the reservation station and is therefore formulated based on (1) the instruction information that is currently validly stored within the reservation station (e.g., awaiting dispatch) and is not vacant and (2) that has been dispatched and therefore is vacant. The preliminary deallocation vector 40 is not affected by any allocation performed by block 35 in cycle n–1 because these results are not written into the reservation station by the write enable logic 1050 (assuming no stall condition) until the end of cycle n and the preliminary deallocation vector 40 is received at the start of cycle n. As will be seen later, this characteristic is useful during stalling conditions.

Stall block 1040 receives the set of uops over bus 1125 and compares the uops from block 1090 to determine (1) if any are FXCH operations or (2) if any are invalid uops. Invalid uops are not intermixed with valid uops, they are located following valid uops because the uops received at block 1090 are received in priority order. Stall logic block 1040 also receives the speculative stall bits generated from cycle n–1 over bus 1220. The stall logic block 1040 determines if any asserted speculative stall bit corresponds with a uop that is (1) valid and (2) not an FXCH. If this occurs, then an allocator stall must occur wherein no more information is allocated to the resource buffers of the processor until vacancies of the reservation station occur. During the allocator stall, the issue units of the processor also stall. The stall signal is asserted over line 1165 and fed to the select input of a multiplexer 1060. The functionality of the multiplexer 1060 will be described further below. The stall signal will become deasserted when the speculative stall bit determination block 1020 informs block 1040 that enough vacancies are located within reservation station 30 to accommodate the uops of block 1090 of cycle n. The logic of block 1040 is further described below with reference to FIG. 12.

With reference to FIG. 10, the entries allocated in cycle n–1 are received by block 1030 over bus 1130. Also, block 1030 receives the set of uops from block 1090 over bus 1125. Block 1030 determines which uops of the set of uops received at cycle n actually need a reservation station entry because they (1) are valid and (2) are not FXCH operations. This function is analogous to the operations performed by block 1040. Of the uops that actually require a reservation entry, as determined by block 1030, the corresponding entries allocated by circuit 35 for these uops are then zeroed or masked by the masking logic of block 1080. The mask logic 1080 receives an input from block 1030 and also receives an input from the preliminary deallocation vector 40 from the reservation station. Those entries of the preliminary deallocation vector 40 that were discovered available for allocation by circuit 35 during cycle n–1 and correspond to a uop of cycle n that needs the entry, are zeroed (marked unavailable) by block 1080. This is done in order to prevent declaring an entry vacant when it is occupied by a uop of cycle n. The resultant deallocation vector is now a "modified" deallocation vector.

The modified deallocation vector is supplied to one input of a multiplexer 1060 and the preliminary deallocation vector 40 is supplied to the other input of multiplexer 1060. The output of the multiplexer 1060 is fed over bus 1140 into circuit 35. Circuit 35 utilizes either the modified deallocation vector or the preliminary deallocation vector 40 (depending on stall conditions as will be described below) in order to determine the vacant entries for allocation for cycle n+1. When no stall is asserted, the modified deallocation vector from block 1080 is fed directly to block 35 through multiplexer 1060. It is appreciated that the logic and circuitry for either the general static or general dynamic implementations of the circuit 35 (as discussed above) may be used within the two cycle pipeline embodiment of the present invention. Once these discovered entries are determined, they are supplied, as shown, for the processing of cycle n+1. Also, a speculative bit determination process 1020 of cycle n is performed and the output speculative bit signals are sent to the processing of cycle n+1.

An output of block 1030, bus 1175, also goes to the write enable logic 1050 so that the reservation station 30 can receive the instruction information of block 1090. Block 1030 utilizes the write enable vectors (e.g., 82, 84, 86, and 88, for h=4) that are generated from block 35, supplied over bus 1130, and that correspond to only those uops that are (1) valid and (2) not FXCH operations. These write enable vectors are output over bus 1175 to the write enable logic 1050 (analogous to that of FIG. 5). Block 1050 also receives instruction information from block 1090. The write enable block 1050 channels the appropriate instruction information of the set of uops received during clock n into the reservation station entries as indicated by bus 1175. As shown, block 1050 is coupled to supply information to the reservation station 30. In this way, only the uops that need a reservation station, and that are received at cycle n, are allocated to the reservation station 30 based on entries discovered during cycle n−1.

With reference to FIG. 10, multiplexer 1060 is needed because if there is a stall condition asserted by line 1165, the multiplexer will channel the preliminary deallocation vector 40 to the circuit 35. This is done because in response to a stall condition, no instructions of cycle 1090 will be validly allocated to the reservation station 30. Although information related to these instructions may be written into the reservation station, this information is marked as invalid. Therefore, there is no need to perform any zeroing or masking (e.g., by block 1080) of the preliminary deallocation vector because the entries allocated by cycle n−1 will not be used and should be made available to circuit 35 for allocation. By supplying the preliminary allocation vector 40 directly to the circuit 35, via the multiplexer 1060, the present invention is able to maximize the number of vacant entries used during allocation during a stall condition.

Refer to FIG. 11A which illustrates circuitry required of the present invention for a single bit of the reservation station. The circuit 1100(0) of FIG. 11A encompasses circuitry for block 1030, 1080 and 1060 as shown in FIG. 10. It is appreciated that the circuit 1100(0) is replicated as appropriate for each entry of the reservation station as 1100(0) to 1100(23) as shown in FIG. 11B. The circuitry of FIG. 11A is exemplary and applicable for the embodiment wherein h=3. However, it can be scaled back by one of ordinary skill to cover the embodiment wherein h is less than three or similarly extended by one of ordinary skill to account for the embodiment wherein h=4 or more.

For entry zero, circuit 1100(0) receives three signals 1125a, 1125b and 1125c from bus 1125 indicating which of the three uops or block 1090 actually require a reservation station entry. This is computed by block 1090, or alternatively by block 1030, or both, by determining which uops are (1) valid and (2) not FXCH operations. According to one embodiment, the circuitry that determines which uops actually need a reservation station may also be implemented as a single circuit with two outputs: (1) one output is generated for the stall circuitry 1040 and (2) a second output generated for the vector generation logic 1080. Signal 1125a corresponds to uop0, signal 1125b corresponds to uop1, and signal 1125c corresponds to uop2. These three signals are fed to each circuit of 1100(0) to 1100(23) of FIG. 11B. The circuit 1100(0) of FIG. 11A also receives three signals 1130a(0), 1130b(0), and 1130c(0) which indicate the particular uop number that was assigned by circuit 30 (in the prior clock cycle) to entry zero of the reservation station, if there was a uop at all assigned to entry zero. Of these three signals, only one will indicate a uop number because only one uop can be assigned to any given reservation station entry. It is appreciated that a second group of signals, 1130a(1), 1130b(1), and 1130c(1) is sent to circuit 1100(1) indicating the uop number assigned to reservation station entry 1, if any, and so on until signals 1130a(23), 1130b(23), and 1130c(23) is fed to circuit 1100(23) for the last reservation station entry.

As shown in FIG. 11A, the appropriate signal pair for each of the three uops is fed to a separate AND gate of gates 1105(0), 1110(0), and 1115(0). The outputs of these AND gates indicate, for entry zero, if a particular uop of block 1090 was allocated to entry zero of the reservation station by circuit 35 and if that uop actually needed a reservation entry. The circuit 35 locates at least three free entries or the modified deallocation vector and these entries are assigned according to priority to uop0, uop1, and uop2 of those uops received at block 1090. The outputs 1175a(0), 1175b(0) and 1175c(0) of AND gates 1105(0), 1110(0), and 1115(0), respectively, are the bits for entry zero of the three write enable vectors that are used by the write enable circuitry 1150 to store instruction information into the reservation station 30. The remainder of the circuitry (see FIG. 11B) of 1100(1) to 1100(23) generate the remainder of the bits of the three 24-bit wide write enable vectors (such as 82, 84, and 86 for h=3). It is appreciated that the write enable vectors are taken from the output of these AND gates 1105(0), 1110(0), and 1115(0) since in the event that a uop of block 1090 is invalid or is an FXCH, there is no need to write that instruction information into the reservation station.

Referring to FIG. 11B, the outputs 1175a(0), 1175b(0) and 1175c(0) are also fed to OR gate 1120(0). The output of OR gate 1120(0) indicates if entry zero of the reservation station was allocated a valid uop that was not an FXCH by circuit 35 during cycle n−1. If this was the case, then OR gate 1120(0) will output a low signal, and in cycle n, entry zero is not available to be allocated to the processing of circuit 35 for cycle n. In such case, AND gate 1080(0) will mask or zero this entry. The AND gate 1080(0) also receives an input for entry zero (e.g., bit zero) from the preliminary deallocation vector 40 indicated as 40(0). The output of AND gate 1080(0) and bit zero of preliminary deallocation vector 40 are both led to inputs of multiplexer 1060(0). The select line of multiplexer 1060(0) originates from block 1040 and is indicated as AL Stall over bus 1165. During a stall condition, AND gate 1145(0) receives entry zero bit from the preliminary deallocation vector 40(0). During nonstall conditions multiplexer 1060(0) sends AND gate 1145(0) the output from AND gate 1180(0) which is the bit from the modified deallocation vector. The output 1140(0) of multiplexer 1060(0) goes to circuit 35 via an AND gate 1145(0) that is used for in case of a reset condition that is not particularly pertinent to the present invention. The reset signal is normally high. As such, as shown in FIG. 11B, outputs 1140(0) to 1140(23) are sent to circuit 35 as the modified deallocation vector.

Provided an entry is available within the preliminary deallocation vector 40 (received in cycle n) that was just allocated in cycle n−1, the AND gate 1080(0) will mask that entry for entry zero so that circuit 35 understands that this entry is not truly vacant anymore. Similar circuitry for OR gate 1120(0), AND gate 1080(0), multiplexer 1060(0), and output 1140(0) is implemented to handle entries 1 to 23 of the reservation station 30 in circuits 1100(1) to 1100(23) of FIG. 11B. Outputs 1140(0) to 1140(23) are sent to circuit 35 and represent the modified deallocation vector. FIG. 11B illustrates the manner in which circuit 1100(0) is replicated for each entry of the reservation station pursuant to the present invention.

Refer to FIG. 12 which illustrates the circuitry for the stall logic block 1040 of FIG. 10. As shown in FIG. 12, signals 1125a, 1125b and 1125c are received which indicate, for uop0, uop1 and uop2, respectively, if these uops are (1) valid and (2) not FXCHs. Also received over bus 1220 are the speculative stall bits that were generated by block 1020. Signal 1220(0) corresponds to uop0 and is fed along with line 1125a to AND gate 1205. Signal 1220(1) corresponds to uop1 and is fed along with line 1125b to AND gate 1207. Signal 1220(2) corresponds to uop2 and is fed along with line 1125c to AND gate 1205. If the circuitry 35 of the previous clock cycle was unable to locate enough vacancies (e.g., less than h vacancies), then one or more of the signals 1220(0)–1200(2) will be asserted. In the event that a speculative bit signal is asserted and the corresponding uop actually needs a reservation station, then an AND gate of 1205, 1207 and 1209 will be asserted. Each of the outputs of the above AND gates feeds an input of OR gate 1121. The output or OR gate 1121 is signal 1165 which is the AL STALL signal. Therefore, the AL STALL signal 1165 is asserted if circuit 35 (in processing of cycle n−1) did not locate enough vacancies for uops of cycle n that (1) are valid and (2) are not FXCH operations. It is appreciated that the logical implementation of the circuits of FIG. 11A, FIG. 11B, and FIG. 12 may be realized using alternative gate circuits to arrive at equivalent signal input and outputs. The circuitry shown should be understood as exemplary.

AL STALL Condition

In the case that not enough entries are allocated, during cycle n−1, for the valid and not FXCH uops of cycle n, AL Stall signal 1165 will be asserted and no instruction information will be validly written into the reservation station. For this reason there is no need to perform the masking operations of block 1080. For this reason the preliminary deallocation vector 40 is directly supplied to circuit 34 via multiplexer 1060 over the modified deallocation vector from mask logic 1080. This increases the likelihood that allocation circuit 35 will locate new vacant entries for the uops of block 1090 during subsequent clock cycles and therefore increases the likelihood that the AL Stall signal will become deasserted. The AL Stall or allocation stall signal will stall the instruction fetch and decode units from issuing new instructions for each clock cycle in which the stall signal is asserted. Meanwhile, the reservation station 30 is allowed to dispatch its contents but is not being filled with new instruction information while the AL Stall signal is asserted. Therefore, eventually, the reservation station 30 will contain sufficient entries to accept the uops of block 1090 and the stall signal will then become deasserted.

The preliminary deallocation vector 40 is used during stall conditions because it represents (1) the instruction information that is currently validly stored within the reservation station (e.g., awaiting dispatch) and is not vacant and (2) that has been dispatched and therefore is vacant. The preliminary deallocation vector 40 that is received during cycle n is not effected at all by the allocation performed by circuit 35 of cycle n−1. Therefore, during stall conditions, the use of the preliminary deallocation vector 40 as an input to circuit 35 for the computation of cycle n does not account for the allocation of cycle n−1 and this is expected since during a stall condition this allocation was not valid.

Various embodiments of the present invention, for providing entry allocation in a two cycle pipeline utilizing preliminary and modified deallocation vectors, are thus described. While the present invention has been described in particular embodiments, it should be appreciated that the present invention should not be construed as limited by such embodiments, but rather construed according to the below claims.

What is claimed is:

1. A two cycle pipeline apparatus for allocating vacant entries of a buffer resource to instruction information relating to instructions for storage into said buffer resource of a pipelined superscalar microprocessor, said instructions received during cycle n of said pipelined superscalar microprocessor, said apparatus comprising:

allocation circuitry for generating, during a cycle n−1, a first list of vacant entries available for allocation to said instructions received during cycle n;

a preliminary deallocation vector received during said cycle n and indicating vacant entries within said buffer resource;

circuitry for receiving, during said cycle n, said first list of vacant entries available for allocation to said instructions received during cycle n; and mask circuitry for masking those entries of said preliminary deallocation vector that correspond to entries of said first list of vacant entries actually allocated to said instructions received during cycle n, so as to generate a modified deallocation vector;

wherein said allocation circuitry, responsive to said modified deallocation vector, is also for generating, during said cycle n, a second list of vacant entries for instructions received during a cycle n+1.

2. A two cycle pipeline apparatus for allocating vacant entries of a buffer resource as described in claim 1 wherein said buffer resource is a reservation station for containing instruction information pending execution within said pipelined superscalar microprocessor.

3. A two cycle pipeline apparatus for allocating vacant entries of a buffer resource as described in claim 1 further comprising speculative stall circuitry operable during said cycle n−1 for generating a speculative stall signal responsive to said first list of vacant entries, said speculative stall signal indicating if said allocation circuitry failed to locate enough vacant entries to allocate to a maximum number of expected instructions to be received for said cycle n.

4. A two cycle pipeline apparatus for allocating vacant entries of a buffer resource as described in claim 1 further comprising logic circuitry for determining which of said instructions received during said cycle n actually require allocation of an entry of said first list of vacant entries.

5. A two cycle pipeline apparatus for allocating vacant entries of a buffer resource as described in claim 4 further comprising circuitry which stores instruction information into said buffer resource for those instructions received during said cycle n that actually require allocation of an entry of said first list of vacant entries available for allocation to said instructions received during said cycle n.

6. A two cycle pipeline apparatus for allocating vacant entries of a buffer resource as described in claim 3 further comprising:

logic circuitry for determining which of said instructions received during said cycle n actually require allocation of an entry of said first list of vacant entries; and stall circuitry for generating an allocation stall signal provided said logic circuitry and said speculative stall circuitry both indicate that an instruction of said cycle n requires allocation of a vacant entry and such entry is not available for allocation to said instruction.

7. A two cycle pipeline apparatus for allocating vacant entries of a buffer resource as described in claim 6 further comprising a multiplexing circuit coupled to receive said preliminary deallocation vector and coupled to receive said modified deallocation vector and responsive to said allocation stall signal for supplying said allocation circuitry with said modified deallocation vector when said allocation stall signal is not asserted.

8. A two cycle pipeline apparatus for allocating vacant entries of a buffer resource as described in claim 7 wherein said multiplexing circuit is for supplying said allocation circuitry with said preliminary deallocation vector when said allocation stall signal is asserted and wherein said allocation circuitry is responsive to said preliminary deallocation vector when said allocation stall signal is asserted.

9. A two cycle pipeline apparatus for allocating vacant entries of a buffer resource as described in claim 2 wherein said preliminary deallocation vector is formulated based on instruction information validly stored within or dispatched from said reservation station just before said cycle n.

10. A two cycle pipeline apparatus for allocating vacant entries of a buffer resource to instruction information relating to instructions for storage into said buffer resource of a pipelined superscalar microprocessor, said instructions received during cycle n of said pipelined superscalar microprocessor, said apparatus comprising:

allocation circuitry for generating during a cycle n−1, a first list of vacant entries available for allocation to said instructions received during cycle n;

a circuit for containing a preliminary deallocation vector received during cycle n, said preliminary deallocation vector indicating vacant entries within said buffer resource; and mask circuitry for receiving, during said cycle n, a second list of vacant entries actually allocated to said instructions received during said cycle n, said second list of vacant entries being derived from said first list of vacant entries;

wherein said mask circuitry is also for masking those entries of said preliminary deallocation vector that correspond to entries of said second list of vacant entries actually allocated to said instructions received during said cycle n, so as to generate a modified deallocation vector; and wherein said allocation circuitry, responsive to a selected deallocation vector comprising either said modified deallocation vector or said preliminary deallocation vector, is also for generating a third list of vacant entries, during said cycle n, available for allocation to instructions received during a cycle n+1, said allocation circuitry comprising:

(a) processing logic circuitry for examining bit sections of said selected deallocation vector for vacant entries and for each of said bit sections examined, generating a plurality of bitmaps associated with each of said bit sections; and (b) multiplexing logic circuitry coupled to receive said bitmaps and for multiplexing each of said bitmaps of said selected deallocation vector and generating therefrom said third list of vacant entries for instructions received during cycle n+1.

11. A two cycle pipeline apparatus for allocating vacant entries as described in claim 10 wherein each of said plurality of bitmaps contains not more than one bit set.

12. A two cycle pipeline apparatus for allocating vacant entries of a buffer resource as described in claim 11 wherein said buffer resource is a reservation station for containing instruction information pending execution.

13. A two cycle pipeline apparatus for allocating vacant entries of a buffer resource as described in claim 11 further comprising speculative stall circuitry operable during said cycle n−1 for generating a speculative stall signal responsive to said first list of vacant entries available for allocation to said instructions received during said cycle n that is generated by said allocation circuitry during said cycle n−1, said speculative stall signal indicating if said allocation circuitry failed to locate enough vacant entries for allocation to a maximum number of expected instructions received for said cycle n.

14. A two cycle pipeline apparatus for allocating vacant entries of a buffer resource as described in claim 11 further comprising logic circuitry for determining which of said instructions received during cycle n actually require allocation of a vacant entry of said buffer resource.

15. A two cycle pipeline apparatus for allocating vacant entries of a buffer resource as described in claim 13 further comprising:

logic circuitry for determining which of said instructions received during said cycle n actually require allocation of a vacant entry of said buffer resource; and stall circuitry for generating an allocation stall signal provided said logic circuitry and said speculative stall circuitry both indicate that an instruction of said cycle n requires allocation of a vacant entry and said vacant entry is not available for allocation to said instruction.

16. A two cycle pipeline apparatus for allocating vacant entries of a buffer resource as described in claim 15 further comprising a multiplexing circuit coupled to receive said preliminary deallocation vector and coupled to receive said modified deallocation vector and responsive to said allocation stall signal for supplying said allocation circuitry with said modified deallocation vector when said allocation stall signal is not asserted.

17. A two cycle pipeline apparatus for allocating vacant entries of a buffer resource as described in claim 16 wherein said multiplexing circuit is for supplying said allocation circuitry with said preliminary deallocation vector when said allocation stall signal is asserted and wherein said allocation circuitry is responsive to said preliminary deallocation vector when said allocation stall signal is asserted.

18. A two cycle pipeline apparatus for allocating vacant entries of a buffer resource as described in claim 12 wherein said preliminary deallocation vector is formulated based on instruction information validly stored within or dispatched from said reservation station just before said cycle n.

19. A computer system comprising:

a bus for providing a communication pathway;

a memory coupled to said bus for storing instructions and program information;

a user interface coupled to said bus for receiving information and for communicating information; and a pipelined superscalar processor coupled to said bus for executing instructions and processing data, said processor comprising a two cycle allocation circuit for allocating entries of a buffer resource for storing instruction information relating to instructions received during a cycle n into said buffer resource, said two cycle allocation circuit comprising:

circuitry for generating, during cycle n−1, a first list of vacant entries available for allocation to said instructions received during cycle n;

circuitry for receiving a preliminary deallocation vector during said cycle n, said preliminary deallocation vector for indicating vacant entries within said buffer resource; and mask circuitry for receiving, during said cycle n, a second list of vacant entries actually allocated to said instructions received during cycle n, said second list of vacant entries being derived from said first list of vacant entries;

wherein said mask circuitry is also for masking those entries of said preliminary deallocation vector that correspond to entries of said second list of vacant entries actually allocated to said instructions received during said cycle n, so as to generate a modified deallocation vector; and wherein said circuitry for generating, responsive to said modified deallocation vector, is also for generating, during said cycle n, a third list of vacant entries available for allocation to instructions received during a cycle n+1.

20. A computer system as described in claim 19 wherein said buffer resource is a reservation station for containing instruction information pending execution.

21. A computer system as described in claim 19 further comprising speculative stall circuitry operable during said cycle n−1 for generating a speculative stall signal responsive to said first list of vacant entries available for allocation to instructions received during said cycle n that is generated by said circuitry for generating, said speculative stall signal indicating if said circuitry for generating failed to locate enough vacant entries to allocate to a maximum number of expected instructions to be received for said cycle n.

22. A computer system as described in claim 19 further comprising logic circuitry for determining which of said instructions received during said cycle n actually require allocation of a vacant entry of said buffer resource.

23. A computer system as described in claim 21 further comprising:

logic circuitry for determining which of said instructions received during said cycle n actually require allocation of a vacant entry of said buffer resource; and stall circuitry for generating an allocation stall signal provided said logic circuitry and said speculative stall circuitry both indicate that an instruction of said cycle n requires a vacant entry and such entry is not available for said instruction.

24. A computer system as described in claim 23 further comprising a multiplexing circuit coupled to receive said preliminary deallocation vector and coupled to receive said modified deallocation vector and responsive to said allocation stall signal for supplying said allocation circuitry with said modified deallocation vector when said allocation stall signal is not asserted.

25. A computer system as described in claim 24 wherein said multiplexing circuit is for supplying said allocation circuitry with said preliminary deallocation vector when said allocation stall signal is asserted and wherein said allocation circuitry is responsive to said preliminary deallocation vector when said allocation stall signal is asserted.

26. A computer system as described in claim 20 wherein said preliminary deallocation vector is based on instruction information validly stored within or dispatched from said reservation station just before said cycle n.

27. In a pipeline superscalar processor, a two cycle pipeline method for allocating vacant entries of a buffer resource to instruction information relating to instructions received during a cycle n of said processor, said two cycle pipeline method comprising the steps of:

generating a first list of vacant entries during a cycle n−1 available for allocation to instructions received during said cycle n;

receiving a preliminary deallocation vector during said cycle n, said preliminary deallocation vector indicating vacant entries within said buffer resource;

generating, during said cycle n, a second list of vacant entries actually allocated to said instructions received during said cycle n, said second list of vacant entries being derived from said first list of vacant entries;

masking those entries of said preliminary deallocation vector that correspond to entries of said second list of vacant entries actually allocated to said instructions received during said cycle n, so as to generate a modified deallocation vector; and generating a third list of vacant entries during said cycle n available for allocation to instructions received during a cycle n+1 in response to a selected deallocation vector comprising either said preliminary deallocation vector or said modified deallocation vector.

28. A two cycle method of allocating vacant entries of a buffer resource as described in claim 27 wherein said buffer resource is a reservation station for containing instruction information pending execution.

29. A two cycle method of allocating vacant entries of a buffer resource as described in claim 27 further comprising the step of generating a speculative stall signal during said cycle n−1 responsive to said first list of vacant entries, said speculative stall signal indicating if said said first list of vacant entries contains less vacant entries than a maximum number of expected instructions to be received for said cycle n.

30. A two cycle method of allocating vacant entries of a buffer resource as described in claim 27 further comprising the step of determining which of said instructions received during said cycle n actually require allocation of a vacant entry of said buffer resource.

31. A two cycle method of allocating vacant entries of a buffer resource as described in claim 30 further comprising the step of storing instruction information into said buffer resource for those instructions received during said cycle n that actually require allocation of an entry of said first list of vacant entries available for allocated to said instructions received during said cycle n.

32. A two cycle method of allocating vacant entries of a buffer resource as described in claim 29 further comprising the steps of:

determining which of said instructions received during said cycle n actually require allocation of a vacant entry of said buffer resource; and generating an allocation stall signal provided said step of determining which of said instructions received during said cycle n actually require allocation of a vacant entry of said buffer resource and said step of generating a speculative stall signal both indicate that an instruction of said cycle n requires allocation of a vacant entry and such a vacant entry is not available for allocation to said instruction.

33. A two cycle method of allocating vacant entries of a buffer resource as described in claim 32 wherein said step of generating said third list of vacant entries includes the step of multiplexing said preliminary deallocation vector and said modified deallocation vector so that said selected deallocation vector comprises said modified deallocation vector when said allocation stall signal is not asserted.

34. A two cycle method of allocating vacant entries of a buffer resource as described in claim 33 wherein said selected deallocation vector comprises said preliminary allocation vector when said allocation stall signal is asserted.

35. A two cycle method of allocating vacant entries of a buffer resource as described in claim 28 wherein said preliminary deallocation vector is based on instruction information validly stored within or dispatched from said reservation station just before said cycle n.

* * * * *

UNITED STATES PATENT AND TRADEMARK OFFICE
CERTIFICATE OF CORRECTION

PATENT NO.   : 5,627,984
DATED        : May 6, 1997
INVENTOR(S)  : Gupta et al.

It is certified that error appears in the above-identified patent and that said Letters Patent is hereby corrected as shown below:

In column 7 at line 7 delete "or" and insert --of--

In column 13 at line 51 delete "Them" and insert --There--

In column 38 at line 26 delete "led and insert --fed--

In column 39 at line 4 delete "or" and insert --of--

Signed and Sealed this

Ninth Day of September, 1997

Attest:

BRUCE LEHMAN

Attesting Officer

Commissioner of Patents and Trademarks